US011859355B2

(12) United States Patent
Townsend et al.

(10) Patent No.: US 11,859,355 B2
(45) Date of Patent: Jan. 2, 2024

(54) WASTE TO ENERGY ASH AND ENGINEERED AGGREGATE IN ROAD CONSTRUCTION

(71) Applicant: University of Florida Research Foundation, Inc., Gainesville, FL (US)

(72) Inventors: Timothy G. Townsend, Gainesville, FL (US); Justin G. Roessler, Gainesville, FL (US); Christopher C. Ferraro, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/962,566

(22) Filed: Oct. 10, 2022

(65) Prior Publication Data

US 2023/0033496 A1   Feb. 2, 2023

Related U.S. Application Data

(62) Division of application No. 15/631,743, filed on Jun. 23, 2017, now abandoned.

(60) Provisional application No. 62/353,732, filed on Jun. 23, 2016.

(51) Int. Cl.

| C04B 28/04 | (2006.01) |
| E01C 3/00 | (2006.01) |
| C08L 95/00 | (2006.01) |
| C04B 18/04 | (2006.01) |
| C04B 26/26 | (2006.01) |
| C04B 20/02 | (2006.01) |
| C04B 111/00 | (2006.01) |
| C04B 111/10 | (2006.01) |

(52) U.S. Cl.
CPC ............ *E01C 3/003* (2013.01); *C04B 18/049* (2013.01); *C04B 20/02* (2013.01); *C04B 26/26* (2013.01); *C04B 28/04* (2013.01); *C08L 95/005* (2013.01); *C04B 2111/0075* (2013.01); *C04B 2111/10* (2013.01); *Y02W 30/91* (2015.05)

(58) Field of Classification Search
CPC .............. C04B 18/049; C04B 28/04; C04B 2111/0075; C08L 95/0005
USPC .................................. 106/638, 702
See application file for complete search history.

(56) References Cited

U.S. PATENT DOCUMENTS

| 5,061,318 A | 10/1991 | Casey |
| 2002/0090871 A1 | 7/2002 | Ritchie et al. |
| 2003/0047114 A1* | 3/2003 | Kayali .................. C04B 18/023 |
| | | 106/405 |
| 2004/0149171 A1* | 8/2004 | Price ....................... C04B 28/02 |
| | | 106/705 |

(Continued)

FOREIGN PATENT DOCUMENTS

| DE | 4117444 A1 | 12/1992 |
| DE | 60031455 T2 | 8/2007 |

(Continued)

OTHER PUBLICATIONS https://www.polygongroup.com/en-US/blog/how-humidity-and-ph-affect-concrete-degradation/ (2020) (Year: 2020).

*Primary Examiner* — James E McDonough
(74) *Attorney, Agent, or Firm* — Thomas | Horstemeyer, LLP

(57) ABSTRACT

Described herein are compositions and methods for waste-to-energy ash in engineered aggregate in road construction.

20 Claims, 19 Drawing Sheets

(56) References Cited

U.S. PATENT DOCUMENTS

2014/0202931 A1* 7/2014 Rush ................. C04B 28/02
209/3

FOREIGN PATENT DOCUMENTS

KR           101367166 B1 * 2/2014
WO    WO-2010002934 A2 * 1/2010 ............. C04B 14/18

* cited by examiner

| Ash | 3/4" to 3/8" Bottom Ash Agg. Fraction | 3/4" to 3/8" Bottom Ash Agg. Fraction | Bottom Ash (all size) | Bottom Ash (all size) |
|---|---|---|---|---|
| | Mean (mg/kg-dry) | Standard Deviation (mg/kg-dry) | Mean (mg/kg-dry) | Standard Deviation (mg/kg-dry) |
| Al | 9,670 | 1,116 | 24,200 | 19,862 |
| As | 1.89 | 1.02 | 10.2 | 2.09 |
| B | 77 | 5.81 | 135 | 23.2 |
| Ba | 152 | 15.6 | 194 | 19.3 |
| Ca | 40,111 | 4,430 | 94,927 | 4,689 |
| Cd | 2.08 | 0.268 | 4.83 | 0.852 |
| Co | 6.99 | 1.04 | 10.9 | 1.77 |
| Cr | 205 | 120 | 88.3 | 33.5 |
| Cu | 11,180 | 7,127 | 2,922 | 4,762 |
| Fe | 23,112 | 1,290 | 26,802 | 13,902 |
| K | 1,488 | 159 | 2,167 | 179 |
| Mg | 2,573 | 257 | 4,607 | 315 |
| Mn | 532 | 31.0 | 340 | 66.6 |
| Mo | 44.8 | 18.4 | 4.41 | 0.550 |
| Na | 3,292 | 322 | 3,980 | 396 |
| Ni | 186 | 209 | 60.4 | 19.9 |
| Pb | 622 | 78 | 541 | 242 |
| Sb | 8.95 | 4.46 | 7.78 | 1.94 |
| Sn | 106 | 99 | 107 | 183 |
| Sr | 139 | 16 | 376 | 28 |
| V | 25 | 1.39 | 17.4 | 1.16 |
| Zn | 520 | 44.3 | 1,533 | 913 |
| *Data represents the mean concentration of 5 replicates for each ash analyzed | | | | |

FIG. 1(a)

| Parameter/ Ash | 3/4" to 3/8" Bottom Ash Agg. Fraction | Facility 1 Refuse Derived Fuel WTE | Facility 2 Mass Burn WTE |
|---|---|---|---|
| Specific Gravity (Unitless) | | | |
| Dry Bulk | 2.2595 | 1.977 | 1.974 |
| Saturated Surface Dry | 2.3447 | 2.153 | 2.160 |
| Apparent | 2.4705 | 2.400 | 2.426 |
| Absorption (%) | 3.78% | 8.91% | 9.45% |

FIG. 1(b)

| Sieve No | 3/4" to 3/8" Bottom Ash Agg. Fraction | Facility 1 Refuse Derived Fuel WTE | Facility 2 Mass Burn WTE |
|---|---|---|---|
| | Cumulative Percent Passing | | |
| 1" | 100.00% | 96.66% | 95.54% |
| 3/4" | 100.00% | 90.66% | 89.10% |
| 3/8" | 13.46% | 56.27% | 59.20% |
| #4 | 0.89% | 28.94% | 39.20% |
| #50 | 0.42% | 5.66% | 15.08% |
| #200 | 0.12% | 1.82% | 4.21% |

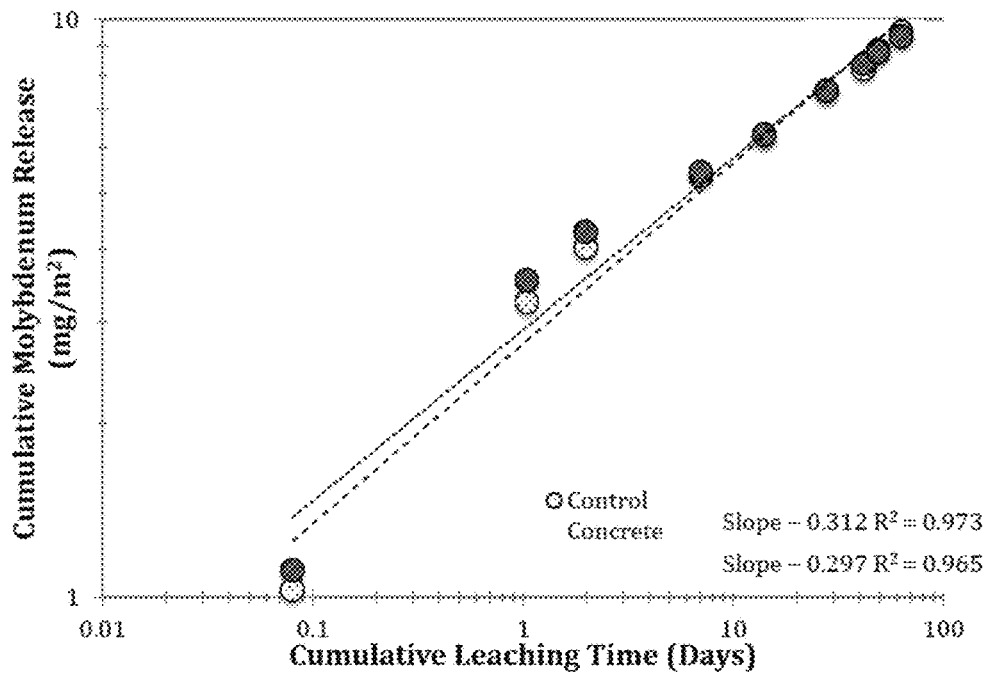

FIG. 5

| Ave ± StdDev (mg/L) [mass release]¹ | Al | Mo | Pb | Sb |
|---|---|---|---|---|
| Ash Amended Asphalt | 5.87 ± 0.91 (117) | 0.007 ± 0.0012 (0.143) | <0.004 | 0.035 ± 0.0054 (0.701) |
| Control Asphalt | 0.431 ± 0.066 (8.62) | <0.002 | <0.004 | 0.0034 ± 0.00069 (0.068) |
| Ash Amended Concrete | 1.37 ± 0.24 (27.4) | 0.071 ± 0.0085 (1.413) | 0.0078 ± 0.001 (0.155) | <0.003 |
| Control Concrete | 0.690 ± 0.12 (13.8) | 0.100± 0.0055 (1.99) | <0.004 | <0.003 |
| WTE BA | 44.3 ± 3.72 (886) | 0.041 ± 0.017 (0.825) | 0.005 ± 0.002 (0.101) | 0.051 ± 0.020 (1.02) |
| GCTL | 0.200² | 0.035 | 0.015 | 0.006 |

¹Represents the mass release (mg-element/kg-pavement) calculated in the SPLP test at a L/S of 20; mass release reported for samples above detection limits.
²Represents a non-health based standard. GCTL for Al is a secondary drinking water standard designed to be protective of non-health based effects.
ª Concentrations are presented only for COPC, for full list of elements evaluated please see the SI section available online

FIG. 6

| Total Environmentally Available Concentration (mg/kg-dry ± StdDev) * | | | | | |
|---|---|---|---|---|---|
| Element | Ash Amended Concrete | Control Concrete | Ash Amended Asphalt | Control Asphalt | WTE BA |
| Al | 5,840 ± 1,280 | 4,390 ± 1,300 | 7,140 ± 2,990 | 4,200 ± 1,230 | 55,400 ± 27,800 |
| Mo | 7.83 ± 2.80 | 12.0 ± 4.61 | 2.41 ± 1.00 | 1.26 ± 0.70 | 9.2 ± 1.20 |
| Sb | 2.41 ± 0.67 | 0.84 ± 0.32 | 4.77 ± 2.11 | < 0.200 | 18.4 ± 4.97 |
| Pb | 47.6 ± 9.88 | < 5.0 | 72.8 ± 39.1 | 12.9 ± 4.48 | 488 ± 13.92 |

FIG. 7

| | Control Concrete | | | Ash-Amended Concrete | | |
|---|---|---|---|---|---|---|
| Cumulative Leaching Time (Days) | pH | Al Conc. (mg/L) | Mo Conc. (mg/L) | pH | Al Conc. (mg/L) | Mo Conc. (mg/L) |
| 0.08 | 10.26 | 0.023 | 0.010 | 10.20 | 0.023 | 0.011 |
| 1.04 | 10.24 | 0.302 | 0.022 | 10.19 | 0.43 | 0.024 |
| 2 | 10.35 | 0.325 | 0.0078 | 10.35 | 0.44 | 0.0075 |
| 7 | 10.16 | 0.598 | 0.014 | 10.45 | 0.91 | 0.012 |
| 14 | 9.40 | 0.362 | 0.010 | 9.62 | 0.62 | 0.0087 |
| 28 | 8.95 | 0.223 | 0.012 | 9.17 | 0.41 | 0.012 |
| 42 | 8.71 | 0.206 | 0.0068 | 9.04 | 0.38 | 0.0086 |
| 49 | 8.73 | 0.195 | 0.0065 | 9.20 | 0.34 | < 0.004 |
| 63 | 8.65 | 0.216 | 0.0064 | 8.86 | 0.32 | 0.0057 |
| | Control Concrete (Continued) | | | Ash-Amended Concrete (Continued) | | |
| Cumulative Leaching Time (Days) | pH | Pb Conc. (mg/L) | Sb Conc. (mg/L) | pH | Pb Conc. (mg/L) | Sb Conc. (mg/L) |
| 0.08 | 10.26 | <0.004 | <0.003 | 10.20 | <0.004 | <0.003 |
| 1.04 | 10.24 | <0.004 | <0.003 | 10.19 | <0.004 | <0.003 |
| 2 | 10.35 | <0.004 | <0.003 | 10.35 | <0.004 | <0.003 |
| 7 | 10.16 | <0.004 | <0.003 | 10.45 | <0.004 | <0.003 |
| 14 | 9.40 | <0.004 | <0.003 | 9.62 | <0.004 | <0.003 |
| 28 | 8.95 | <0.004 | <0.003 | 9.17 | <0.004 | <0.003 |
| 42 | 8.71 | <0.004 | <0.003 | 9.04 | <0.004 | <0.003 |
| 49 | 8.73 | <0.004 | <0.003 | 9.20 | <0.004 | <0.003 |
| 63 | 8.65 | <0.004 | <0.003 | 8.86 | <0.004 | <0.003 |

FIG. 8

|  | Control Asphalt | | | Ash-Amended Asphalt | | |
|---|---|---|---|---|---|---|
| Cumulative Leaching Time (Days) | pH | Al Conc. (mg/L) | Sb Conc. (mg/L) | pH | Al Conc. (mg/L) | Sb Conc. (mg/L) |
| 1.04 | 9.14 | 0.0296 | < 0.003 | 8.82 | 0.859 | 0.0053 |
| 2 | 8.04 | 0.0260 | < 0.003 | 8.46 | 0.471 | 0.0032 |
| 7 | 8.36 | 0.0633 | < 0.003 | 8.26 | 0.871 | 0.0056 |
| 14 | 8.02 | 0.0569 | < 0.003 | 7.91 | 0.688 | 0.0068 |
| 28 | 8.32 | 0.0566 | < 0.003 | 8.17 | 0.685 | 0.0082 |
| 42 | 8.10 | 0.0494 | < 0.003 | 8.08 | 0.538 | 0.0049 |
| 49 | 8.03 | 0.0749 | < 0.003 | 7.97 | 0.757 | 0.0089 |
| 63 | 7.96 | 0.0673 | < 0.003 | 7.58 | 0.704 | 0.0087 |
|  | Control Asphalt (Continued) | | | Ash-Amended Asphalt (Continued) | | |
| Cumulative Leaching Time (Days) | pH | Pb Conc. (mg/L) | Mo Conc. (mg/L) | pH | Pb Conc. (mg/L) | Mo Conc. (mg/L) |
| 1.04 | 9.14 | <0.004 | <0.002 | 8.82 | <0.004 | 0.0026 |
| 2 | 8.04 | <0.004 | <0.002 | 8.46 | <0.004 | <0.002 |
| 7 | 8.36 | <0.004 | <0.002 | 8.26 | <0.004 | 0.0031 |
| 14 | 8.02 | <0.004 | <0.002 | 7.91 | <0.004 | 0.0030 |
| 28 | 8.32 | <0.004 | <0.002 | 8.17 | <0.004 | 0.0039 |
| 42 | 8.10 | <0.004 | <0.002 | 8.08 | <0.004 | <0.002 |
| 49 | 8.03 | <0.004 | <0.002 | 7.97 | <0.004 | 0.0040 |
| 63 | 7.96 | <0.004 | <0.002 | 7.58 | <0.004 | 0.0027 |

FIG. 9

| | Aluminum- LI / $D^{obs}$ (cm$^2$/s) <br> Min <br> Max <br> (Mean) | Antimony- LI / $D^{obs}$ (cm$^2$/s) <br> Min <br> Max <br> (Mean) |
|---|---|---|
| Ash Amended Asphalt | 12.1 / 8.54*10$^{-13}$ <br> 11.0 / 9.34*10$^{-12}$ <br> (11.5 / 3.37*10$^{-12}$) | 9.77 / 1.66*10$^{-10}$ <br> 8.54 / 2.87*10$^{-9}$ <br> (9.14 / 7.12*10$^{-10}$) |
| Control Asphalt | 14.0 / 9.89 *10$^{-15}$ <br> 12.6 / 2.44 *10$^{-13}$ <br> (13.2 / 5.81 *10$^{-14}$) | - |
| Ash Amended Concrete | 13.4 / 4.00*10$^{-14}$ <br> 11.1 / 7.90*10$^{-12}$ <br> (11.7 / 2.19*10$^{-12}$) | - |
| Control Concrete | 13.2 / 6.66 *10$^{-14}$ <br> 11.2 / 6.97 *10$^{-12}$ <br> (11.8 / 1.64 *10$^{-12}$) | - |

FIG. 10

| Material Type | Weight (kg/m³) | Volume (m³) |
|---|---|---|
| Cement Type I/II | 326 | 2.14 |
| Coal Fly Ash | 59.3 | 0.543 |
| Lime rock | 715 | 6.08 |
| WTE Bottom Ash | 285 | 2.60 |
| Sand | 701 | 5.50 |
| Water | 163 | 3.37 |
| Entrained Air | - | 0.413 |
|  |  |  |
| W/C | 0.42 |  |

| Material | RAP | Course Aggregate | WTE Bottom Ash | Screenings | Sand |
|---|---|---|---|---|---|
| Percentage of Material in Mix | 20 | 20 | 20 | 32 | 8 |
| Sieve Size | Percent Passing | | | | |
| 3/4" 19.0mm | 100 | 100 | 100 | 100 | 100 |
| 1/2" 12.5mm | 99 | 95 | 87 | 100 | 100 |
| 3/8" 9.5mm | 96 | 62 | 57 | 100 | 100 |
| No. 4 4.75mm | 77 | 14 | 18 | 96 | 100 |
| No. 8 2.36mm | 61 | 6 | 10 | 70 | 100 |
| No. 16 1.18mm | 50 | 3 | 9 | 47 | 100 |
| No. 30 600µm | 42 | 3 | 8 | 30 | 90 |
| No. 50 300µm | 32 | 2 | 7 | 18 | 65 |
| No. 100 150µm | 17 | 2 | 5 | 10 | 20 |
| No. 200 75µm | 8.7 | 1.2 | 3.5 | 7 | 2 |
| $G_{sb}$ | 2.616 | 2.627 | 2.275 | 2.58 | 2.626 |

FIG. 15(a)

| | |
|---|---|
| $P_b$ | 5.6 |
| $G_{mb}$ | 2.318 |
| $G_{mm}$ | 2.415 |
| $V_a$ | 4 |
| VMA | 13.6 |
| VFA | 71 |
| $P_{be}$ | 4.2 |

FIG. 15(b)

|  | Concrete | | | |
| --- | --- | --- | --- | --- |
|  | Ash A | Ash B | Control A | Control B |
| Mass Dry (kg) | 1.69 | 1.65 | 1.69 | 1.80 |
| Average Height (cm) | 9.52 | 10.16 | 10.16 | 9.68 |
| Dia (cm) | 10.16 | 10.16 | 10.16 | 10.16 |
| Surface Area ($m^2$) | 0.0466 | 0.0486 | 0.0486 | 0.0471 |
| Water Volume (L) | 4.66 | 4.86 | 4.86 | 4.71 |
| Sample Volume ($m^3$) | 0.000772 | 0.000824 | 0.000824 | 0.000785 |
| Density-Dry ($kg/m^3$) | 2,184 | 1,998 | 2,047 | 2,299 |
|  | Asphalt | | | |
|  | Ash A | Ash B | Control A | Control B |
| Mass Dry (kg) | 1.09 | 1.28 | 1.06 | 1.30 |
| Average Height (cm) | 6.66 | 7.77 | 6.19 | 7.69 |
| Dia (cm) | 10.16 | 10.16 | 10.16 | 10.16 |
| Surface Area ($m^2$) | 0.0375 | 0.0410 | 0.0360 | 0.0408 |
| Water Volume (L) | 3.75 | 4.10 | 3.60 | 4.08 |
| Sample Volume ($m^3$) | 0.000540 | 0.000630 | 0.000502 | 0.000623 |
| Density-Dry ($kg/m^3$) | 2,013 | 2,027 | 2,106 | 2,079 |

FIG. 16

| Element (mg/L) | Ash Amended Asphalt | Control Asphalt | Ash Amended Concrete | Control Concrete | WTE BA |
|---|---|---|---|---|---|
| Al | 5.87 | 0.431 | 1.37 | 0.690 | 44.3 |
| As | <0.004 | <0.004 | <0.004 | <0.004 | 0.004 |
| B | 0.044 | 0.006 | 0.007 | 0.006 | 0.128 |
| Ba | 0.028 | 0.039 | 0.697 | 0.504 | 0.151 |
| Be | <0.002 | <0.002 | <0.002 | <0.002 | 0.001 |
| Ca | 49.9 | 7.07 | 521 | 461 | 124.2 |
| Cd | <0.002 | <0.002 | <0.002 | <0.002 | 0.002 |
| Cr | 0.004 | <0.002 | 0.034 | 0.041 | 0.006 |
| Cu | <0.006 | <0.006 | 0.007 | <0.006 | 0.198 |
| Fe | 0.011 | 0.006 | 0.010 | 0.004 | 0.052 |
| Mg | 0.086 | 0.258 | 0.013 | 0.010 | 0.041 |
| Mn | <0.001 | <0.001 | <0.001 | <0.001 | 0.001 |
| Mo | 0.007 | <0.002 | 0.071 | 0.100 | 0.041 |
| Na | 11.6 | 0.504 | 14.6 | 8.97 | 75.7 |
| Ni | <0.002 | <0.002 | <0.002 | <0.002 | 0.002 |
| Pb | <0.004 | <0.004 | 0.008 | <0.004 | 0.005 |
| Sb | 0.035 | <0.003 | <0.003 | <0.003 | 0.051 |
| Se | <0.006 | <0.006 | <0.006 | <0.006 | 0.002 |
| Sn | <0.003 | <0.003 | <0.003 | <0.003 | 0.002 |
| Sr | 0.098 | 0.023 | 1.981 | 1.573 | 0.465 |
| V | <0.004 | <0.004 | <0.004 | <0.004 | 0.021 |
| Zn | 0.007 | 0.014 | 0.010 | 0.017 | 0.047 |

FIG. 17

| Element (mg/kg ± STDev) | Ash Amended Asphalt | Control Asphalt | Ash Amended Concrete | Control Concrete | WTE BA |
|---|---|---|---|---|---|
| Al | 7,140 ± 2,990 | 4,204 ± 327 | 5,835 ± 1,280 | 4,390 ± 123 | 55,379 ± 27,800 |
| As | 1.39 ± 0.61 | 1.04 ± 0.11 | 6.87 ± 2.62 | 10.6 ± 0.28 | 2.65 ± 1.84 |
| B | 62 ± 25.5 | 25 ± 1.51 | 53 ± 13.1 | 35.3 ± 2.49 | 181 ± 27.2 |
| Ba | 103 ± 47.3 | 6.3 ± 0.29 | 110 ± 96.9 | 47 ± 1.22 | 391 ± 42.8 |
| Be | 1.170 ± 0.51 | 1.03 ± 0.05 | 0.404 ± 0.05 | 0.403 ± 0.01 | < 0.51 |
| Ca | 43,500 ± 17,800 | 93,800 ± 9,770 | 157,800 ± 58,600 | 191,000 ± 6,040 | 60,900 ± 3,020 |
| Cd | 3.96 ± 1.62 | 0.77 ± 0.05 | 1.13 ± 0.30 | 0.82 ± 0.14 | 10 ± 0.70 |
| Cr | 18.5 ± 7.72 | 5.43 ± 0.84 | 27.48 ± 23.1 | 12.9 ± 0.31 | 239 ± 306 |
| Cu | 664 ± 1,004 | 8.57 ± 9.77 | 181 ± 340 | 43 ± 1.2 | 1,630 ± 626 |
| Fe | 26,549 ± 10,900 | 12,246 ± 751 | 10,590 ± 3,000 | 4,760 ± 150 | 65,200 ± 10,500 |
| K | 402 ± 164 | 160 ± 19.5 | 622 ± 198 | 689 ± 26.3 | 1,870 ± 83.6 |
| Mg | 3,630 ± 1,500 | 3,370 ± 230 | 1,690 ± 282 | 278 ± 487 | 4,710 ± 313 |
| Mn | 354 ± 147 | 281 ± 18.2 | 108 ± 40.6 | 34 ± 0.92 | 1,056 ± 431 |
| Mo | 2.41 ± 1.00 | 1.26 ± 0.34 | 7.83 ± 2.80 | 12.0 ± 0.24 | 9.24 ± 1.20 |
| Na | 1,190 ± 493 | 156 ± 14.0 | 954 ± 292 | 511 ± 21.7 | 7,490 ± |
| Ni | 16.2 ± 6.76 | 7.47 ± 0.65 | 26.8 ± 14.6 | 5.10 ± 0.08 | 104 ± 30.6 |
| Pb | 72.8 ± 39.1 | < 5.0 | 47.6 ± 9.88 | 12.9 ± 0.50 | 488 ± 13.9 |
| Sb | 4.77 ± 2.11 | < 0.20 | 2.41 ± 0.67 | 0.84 ± 0.18 | 18.4 ± 4.97 |
| Se | 0.557 ± 0.24 | < 0.300 | 0.642 ± 0.27 | 0.694 ± 0.14 | < 1.01 |
| Sn | 18.1 ± 9.65 | 2.46 ± 0.07 | 8.70 ± 1.18 | 3.00 ± 0.10 | 54 ± 4.07 |
| Sr | 61 ± 25.3 | 110 ± 8.78 | 434 ± 167 | 556 ± 24.9 | 204 ± 24.8 |
| V | 25.5 ± 10.6 | 24.5 ± 1.59 | 15.0 ± 2.30 | 20.9 ± 1.52 | 15.8 ± 2.6 |
| Zn | 438 ± 188 | 31 ± 189 | 332 ± 189 | 137 ± 3.94 | 1,860 ± 307 |

FIG. 18

| Check | Component Weights (kg/m³)[a] | | | |
|---|---|---|---|---|
| Material | Control Mix | 25% WTE Ash | 50% WTE Ash | 75% WTE Ash |
| Cement Type I/II | 314 | 314 | 314 | 314 |
| Coal fly ash (Class F) | 55.8 | 55.8 | 55.8 | 55.8 |
| Coarse Aggregate [a] | 1010 | 758 | 505 | 252 |
| WTE BA [a] | 0 | 252 | 505 | 758 |
| Sand [a] | 654 | 654 | 654 | 654 |
| Water | 195 | 195 | 195 | 195 |
| Entrained Air | 0 | 0 | 0 | 0 |
| Water to Cement Ratio | 0.526 | 0.526 | 0.526 | 0.526 |

[a] Weights are reported in Saturated Surface Dry (SSD) conditions

FIG. 19

| | Specific Gravity | Absorption (%) |
|---|---|---|
| WTE LT-9.5 | 2.26 | 3.78 |
| WTE GT-9.5 | 2.17 | 5.58 |
| | Los Angeles Abrasion | |
| WTE LT-9.5 | C – Grade [a] | 38% Loss |
| WTE GT-9.5 | B – Grade [a] | 42% Loss |

[a] Grade represents the particle size distribution tested and the number of charges used in the test, this is reviewed in further detail in Materials and Methods Section 2.2

FIG. 20

| Sieve Size mm (inches) | Mass Percentage Passing |
|---|---|
| 38.1 (1.5) | 100 |
| 25.4 (1) | 95-100 |
| 12.7 (0.5) | 25-60 |
| 4.75 (0.187) | 0-100 |
| 2.36 (0.093) | 0-5 |

US 11,859,355 B2

WASTE TO ENERGY ASH AND ENGINEERED AGGREGATE IN ROAD CONSTRUCTION

CROSS-REFERENCE TO RELATED APPLICATIONS

This application is a divisional of U.S. utility application Ser. No. 15/631,743, filed Jun. 23, 2017, which claims priority to U.S. provisional application Ser. No. 62/353,732, filed on Jun. 23, 2016, both of which are incorporated herein by reference in their entireties.

BACKGROUND

Waste-to-energy (WTE) is a form of energy recovery that can generate energy, such as heat or electricity, from the primary treatment of waste. Incineration is a primary treatment used frequently in WTE schemes that generates ash byproducts (fly ash and bottom ash) during waste incineration and energy generation. There is currently interest in systems and methods directed at the reuse recycling of WTE ash instead of landfill disposal. The use of WTE bottom ash (BA) as a roadway base course or as an aggregate replacement in hot mix asphalt (HMA) or Portland cement concrete (PCC) pavements are potential applications for WTE BA recycling. While WTE BA displays potential for these applications, problems such as hydrogen gas generation and heavy metal leaching preclude the widespread use of WTE BA in road construction. The present disclosure discusses compositions and methods for waste-to-energy ash in engineered aggregate in road construction, to address the aforementioned deficiencies and inadequacies.

SUMMARY

Described herein are compositions of waste-to-energy bottom ash. In embodiments, compositions comprising waste-to-energy bottom ash (WTE BA) aggregates sized about 9.5 mm to about 19.05 mm, wherein the composition has an aluminum content of about 25,000 mg/kg dry or less. The aluminum content can be determined using EPA testing method 3050b.

Compositions as described herein can comprises about 12% to about 20% of total WTE BA that passes through a ⅜ inch sieve.

Compositions as described herein can comprise WTE BA aggregates and water, which form an aqueous suspension with a pH of about 11 or less basic.

Compositions as described herein can react with $CO_2$ from a $CO_2$ source.

Compositions as described herein can be Portland cement concrete compositions comprising Portland cement concrete and a WTE BA aggregate fraction, wherein the WTE BA aggregate fraction contains WTE BA aggregates of about 9.5 mm to about 19.05 mm in size, wherein the aggregate fraction has an aluminum content of about 25,000 mg/kg dry or less. Aluminum content of compositions such as these can be determined using EPA testing method 3050b. In compositions such as these, the WTE BA aggregate fraction can be about 50% or less of the total composition. Compositions can further comprise coal fly ash. Portland cement concrete compositions can comprise a WTE BA aggregate fraction that has been mixed with water to form an aqueous suspension with a pH of about 8 to about 11. The WTE BA aggregate fraction of PCC compositions can be reacted with $CO_2$ from a $CO_2$ source.

Described herein are compositions of hot mix asphalt (HMA), comprising hot mix asphalt and a WTE BA aggregate fraction, wherein the WTE BA aggregate fraction contains WTE BA aggregates between about 9.5 mm to about 19.05 mm in size, wherein the aggregate fraction has an aluminum content of about 25,000 mg/kg dry or less. The aluminum content can be determined using EPA testing method 3050b. The WTE BA aggregate fraction can be about 50% or less of the total composition. The WTE BA aggregate fraction can be mixed with water to form an aqueous suspension with a pH of about 11 or less basic. HMA compositions as described herein can further comprise coal fly ash. The WTE BA aggregate fraction of HMA compositions can be reacted with $CO_2$ from a $CO_2$ source.

Described herein are methods of altering a composition of waste-to-energy bottom ash (WTE BA), comprising separating WTE BA with a first separation device to isolate a first WTE BA aggregate fraction, wherein the first aggregate fraction contains WTE BA aggregates about 9.5 mm or larger in size; and separating the first WTE BA aggregate fraction with a second separation device to isolate a second aggregate fraction, wherein the second aggregate fraction contains WTE BA aggregates of about 9.5 mm to about 19.05 mm in size, wherein the second aggregate fraction has an aluminum content of about 25,000 mg/kg dry or less. The aluminum content can be determined using EPA method 3050b. The first separation device can be a ⅜ inch sieve. The second separation device can be a ¾ inch sieve. Methods as described herein can further comprise reacting the second aggregate fraction with $CO_2$ from a $CO_2$ source. Methods as described herein can further comprising aging the second aggregate fraction after separating the first WTE BA aggregate fraction, wherein aging the second aggregate fraction comprises placing the second aggregate fraction in a lined unit, adding water to the second aggregate fraction to form an aqueous suspension, and reacting the aqueous suspension with $CO_2$ from a $CO_2$ source over a period of time until the pH of the second aggregate in aqueous suspension is between about 8.0 to about 11.0.

Portland cement concrete compositions as described herein can comprise tricalcium silicate, dicalcium silicate, tricalcium aluminate, tetracalcium aluminoferrite, free calcium oxide, and sulfur trioxide, individually or in combination.

Hot mix asphalt compositions as described herein can comprise sand, RAP, course aggregate, and screenings, individually or in combination.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles.

Moreover, in the drawings, like reference numerals designate corresponding parts throughout the several views.

FIGS. 1(a)-(c) illustrate ash characterization data.

FIG. 2 represents an embodiment of a lined unit.

FIG. 5 illustrates log-log comparison of the cumulative release of molybdenum (Mo) from concrete pavements (mg/m²) and leaching according to method 1315.

FIG. 6 shows leached synthetic precipitation leaching procedure (SPLP) concentrations for embodiments of ash amended and control pavements.

FIG. 7 represents the total environmentally available concentration of trace elements in embodiments of ash amended and control pavements.

FIG. 8 illustrates method 1315 constituents of potential concern (COPC) release and eluate pH from embodiments of concrete pavements.

FIG. 9 illustrates method 1315 COPC release and eluate pH from embodiments of asphalt pavements.

FIG. 10 shows leachability index and observed diffusivity.

FIGS. 15(a) and (b) depict embodiments of asphalt mix design and volumetric properties used for ash-amended pavement[s] (a) and mix properties (b).

FIG. 16 shows pavement dry density and exposed surface area of embodiments of concrete and asphalt pavements.

FIG. 17 represents a list of leached elements in SPLP test and total concentrations of leached concentration of elements in SPLP test according to embodiments of the present disclosure.

FIG. 18 shows total environmentally available concentrations of trace elements in ash amended and control pavements according to embodiments of the present disclosure.

FIG. 19 shows bottom ash aggregate data and laboratory and field mixes of embodiments of the present disclosure.

FIG. 20 shows ash specific gravity, absorption, and results of Los Angeles abrasion testing according to embodiments of the present disclosure.

DETAILED DESCRIPTION

Figures 1C, 2:
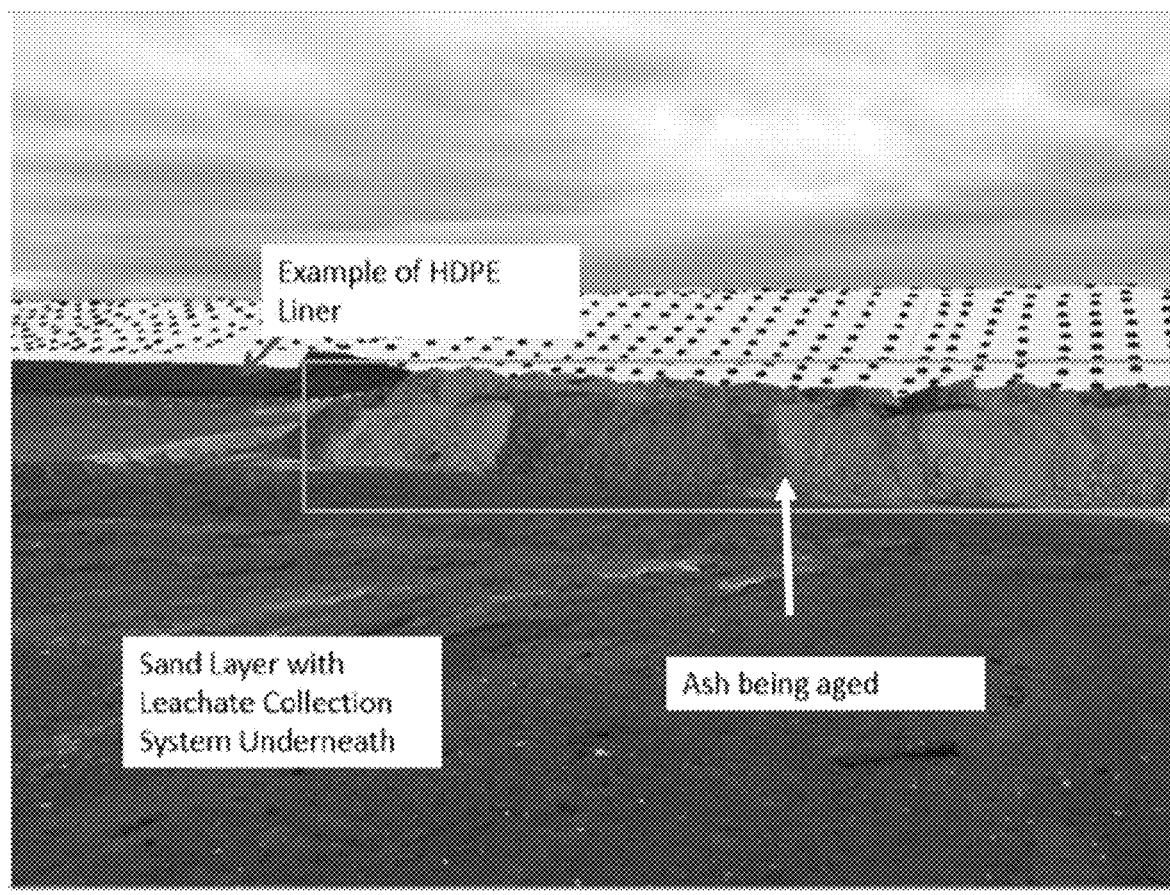

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Embodiments of the present disclosure provide for compositions and methods for waste-to-energy bottom ash an engineered aggregate in road construction. Incineration is one method of waste-to-energy (WTE) generation that results in ash byproducts, primarily fly coal ash and bottom ash (BA). It can be possible to recycle and reuse WTE ash by-products, BA especially. A potential application for WTE BA recycling is the use of WTE BA in road construction. Portland Cement Concrete (PCC) and hot mix asphalt (HMA) compositions can be formulated with WTE BA and can be used to construct roads. WTE BA aggregates can also be used as a granular aggregate base course. While there are numerous applications for the use of recycled WTE BA, the use of WTE BA is problematic currently in road construction because of environmental concerns and concerns relating to the strength of the finished concrete and/or road product.

Described herein are compositions of WTE BA and methods that can alter the composition of WTE BA aggregates and make WTE BA aggregates more suitable for use in road construction and materials related to road construction.

Size and composition of WTE BA aggregates can be a factor relating to the suitability of recycled WTE BA in road construction. Total WTE BA can be separated with one or more separation devices as described herein to create a composition or alter the composition of WTE BA and produce specific WTE BA gradations, aggregate fractions, and/or separated WTE BA aggregates of a desired size. As used herein, compositions of WTE BA can be WTE BA aggregates that constitute an aggregate fraction, and a composition of WTE BA can be a WTE BA aggregate fraction comprised of WTE BA aggregates. The one or more separation devices can be sieves, and can comprise a ⅜ inch sieve and/or a ¾ inch sieve. As used herein, ⅜ of an inch can be about 9.5 mm and ¾ of an inch can be about 19.05 mm. Alternatively, 9.5 mm can be about ⅜ of an inch and 19.05 mm can be about ¾ of an inch.

In an embodiment, WTE BA can be separated with one or more separation devices, which can be sieves, and can comprise a ⅜ inch sieve and/or ¾ inch sieve, until aggregates and/or an aggregate fraction of a desired size are produced. In an embodiment, WTE BA can be separated until separated WTE BA aggregates having a size of about ⅜ of an inch to about ¾ of an inch are the only aggregates remaining. In an embodiment, WTE BA can be separated until separated WTE BA aggregates having a size of about ½ of an inch to about ⅝ of an inch are the only aggregates remaining. The size of the aggregates as used herein can be the radius, diameter, circumference, length, width, area, volume, cross-sectional surface area, or other physical dimension of a WTE BA aggregate. After separation with one or more separation devices, separated WTE BA aggregates having a size of about ¾ inch to about ⅜ inch can be used according to the systems and methods described herein. Separated WTE BA aggregates for use according to the systems and methods described herein can be within a WTE BA aggregate fraction that represents about 12% to about 30%, or about 15% to about 30%, or about 15% of total WTE BA that passes through a ⅜ inch sieve. WTE BA aggregates can be with a WTE BA aggregate fraction that represents about 12% to about 25%, about 15% to about 25%, or about 20% of total WTE BA that passes through a ¼" sieve.

In an embodiment, a separation device can be used to first remove WTE BA aggregates and/or particulates smaller than about 9.5 mm, producing a WTE BA aggregate fraction. The WTE BA aggregate fraction can be subjected to a second separation device wherein WTE BA aggregates and/or particulates of about 19.05 mm or larger are removed from the aggregate fraction. In another embodiment, WTE BA can be subjected to a first separation device where WTE BA aggregates and/or particulates of about 19.05 mm or larger are removed, producing an aggregate fraction, and then the aggregate fraction subjected to a second separation device that removes WTE BA aggregates and/or particulates of about 9.5 mm or less. In an embodiment, a WTE BA aggregate fraction contains WTE BA aggregates ranging in size of about 9.5 mm to about 19.05 mm or about ⅜ of an inch to about ¾ of an inch. Alternatively, a separation device can be comprised of one or more grates that separate out and/or isolate a WTE BA aggregate fraction containing WTE BA aggregates sized about 9.5 to about 19.05 mm for use in road construction. In an embodiment, a trommel screen can be a separation device used to separate out and/or isolate a WTE BA aggregate fraction containing WTE BA aggregates sized about 9.5 to about 19.05 mm. Separation devices as described herein can optionally be vibrated or coupled to a vibration device or device that vibrates the one or more separation devices to aid in size-separation of WTE BA aggregates. The systems and methods of WTE BA separation as described herein can alter the composition of WTE BA and remove elements, alloys, particulates, and/or other contaminants from the WTE BA that are detrimental to the use of WTE BA in road construction. One or more separation devices as described above can be used to change the size and/or composition of WTE aggregates and can remove metals, elements, alloys, and/or other contaminants from the WTE BA. Examples of metals and elements that can be removed from WTE BA aggregates and/or a WTE BA aggregate fraction are aluminum (Al), arsenic (As), boron (B), barium (Ba), calcium (Ca), cadmium (Cd), cobalt (Co), iron (Fe), potassium (K), magnesium (Mg), sodium (Na), antimony (Sb), strontium (Sr), zinc (Zn), alloys of any combination of these, or others. The one or more separation devices can alter the composition of WTE BA aggregates and produce WTE BA aggregates that generate less hydrogen ($H_2$) gas when incorporated into road construction materials than naïve, unseparated and/or unaltered WTE BA aggregates, which is advantageous because it can increase the structural integrity and/or strength of resulting road products.

Environmental Protection Agency (EPA) testing method 3050b (acid digestion of sediment, sludge, and soil) is one method that can be used to determine composition of WTE BA aggregates and/or aggregate fractions. Other tests that can be used to determine composition (elemental, alloy, contaminant, and/or otherwise) of WTE BA aggregates and/or aggregate fractions can include acid digestion with nitric and/or hydrofluoric acid (EPA Method 3052 for example), x-ray fluorescence, and reaction with hydroxides (OH—). Tests using reaction with hydroxides can evaluate composition (such as Al content) through the volumetric measurement of hydrogen gas produced by the reaction of the element, alloy, or contaminant (which can be Al or contain Al) in WTE BA aggregates and/or aggregate fractions. Exact measurements produced by different tests may produce different results as some testing methodology is destructive (and destroys some of the components to be measured, producing lower measurements than non-destructive methods) and some testing methods are non-destructive.

In an embodiment, a WTE BA aggregate fraction contains a total Al content of about 5,200 mg/kg (dry) to about 14,200 mg/kg (dry). In an embodiment, a WTE BA aggregate fraction contains a total Al content of about 9,670 mg/kg (dry). In an embodiment, a WTE BA aggregate fraction contains a total Al content of less than about 25,000 mg/kg (dry). In an embodiment, a WTE BA aggregate fraction contains a total Al content of less than about 14,200 mg/kg (dry). In an example, a WTE BA aggregate fraction contains a total Al content of less than about 25,000 mg/kg (dry) as determined by EPA testing method 3050b.

In an embodiment, a WTE BA aggregate fraction contains WTE BA aggregates sized about 9.5 mm to about 19.05 mm, and the WTE BA aggregate fraction has a total Al content of about 9,670 mg/kg (dry) or less. In an embodiment, a WTE BA aggregate fraction contains WTE BA aggregates sized about 9.5 mm to about 19.05 mm, and the WTE BA aggregate fraction has a total Al content of about 25,000 mg/kg (dry) or less. In an example, a WTE BA aggregate fraction contains WTE BA aggregates sized about 9.5 mm to about 19.05 mm and the aggregate fraction has a total Al content of less than about 25,000 mg/kg (dry) according to EPA testing method 3050b.

In an embodiment, a WTE BA aggregate fraction contains WTE BA aggregates sized about 9.5 mm to about 19.05 mm, and the WTE BA aggregate fraction has a total Al content of less than about 25,000 mg/kg (dry). In an embodiment, a WTE BA aggregate fraction contains WTE BA aggregates sized about ⅜ of an inch to about ⅝ of an inch, and the WTE BA aggregate fraction has a total Al content of less than about 25,000 mg/kg (dry). In an embodiment, a WTE BA aggregate fraction contains WTE BA aggregates sized about 9.5 mm to about 19.05 mm, and the WTE BA aggregate fraction has a total Al content of less than about 14,200 mg/kg (dry). In an embodiment, a WTE BA aggregate fraction contains WTE BA aggregates sized about 9.5 mm to about 19.05 mm, and the WTE BA aggregate fraction has a total Al content between about 5,200 mg/kg (dry) and about 14,200 mg/kg (dry). In an embodiment, elements contained in WTE BA and a WTE BA aggregate fraction containing aggregates ⅜" to ¾" in size can be seen in FIG. 1(a). Further characterization data can be seen in FIG. 1(b) and FIG. 1(c). In an embodiment, a WTE BA aggregate fraction can: contain WTE BA ash aggregates sized about 9.5 mm and about 19.05 mm; have a total Al content of less than about 14,200 mg/kg (dry); and/or have a dry bulk specific gravity of about 2.1 to about 2.5, a saturated surface dry specific gravity of about 2.2 to about 2.6, an apparent specific gravity of about 2.3 to about 2.7, and an absorption of about 2.0% to about 5.0%.

Following separation with the one or more separation devices, WTE BA aggregates or a WTE BA aggregate fraction can be optionally be placed in a lined unit for curing and aging. The unit can be of any material of suitable strength to retain and/or hold an aqueous mixture containing ash. The lining of the unit can be any suitable material that does not permit the passage of water and/or liquid between an aqueous suspension in the lined unit and the unit itself. The lining can be a hydrophobic material and can be a material that does not absorb water or other liquids. The lining of the unit can be constructed of plastic or a plastic-like polymer. The lined unit can be designed to collect and/or retain rainwater or other moisture from the atmosphere. The lined unit can be constructed and/or configured to receive water from a water source. The lined unit can be constructed and/or configured to receive carbon dioxide ($CO_2$) from a carbon dioxide source ($CO_2$ source). An example of a lined unit is shown in FIG. 2.

Once in the lined unit, WTE BA aggregates or aggregate fraction can optionally be mixed with water to form an aqueous suspension. The water can be rainwater that is collected in the lined unit, or can be another type of water from a water source that is delivered into the lined unit, such as water from a well or a reservoir.

Over a period of time, the pH of the aqueous suspension, which can generally be alkaline, can decrease and the WTE BA aggregates and/or aggregate fraction cures. The pH of the aqueous suspension can be measured by a pH measuring device. The pH measuring device can be any pH measuring device known in the art, such as litmus paper or a commercially available pH meter. WTE BA aggregates or aggregate fraction in an aqueous solution with a pH of about 10.5, or about pH 8.0 to about pH 11.0, can be suitable for use in PCC and HMA. WTE BA aggregates or aggregate fraction in an aqueous solution with a pH of about 10.5 to about 9.5 can be suitable for use in PCC and HMA. WTE BA can be left in the lined unit in the presence of water until the pH of the aqueous solution is about 11.0 or about 10.5 or less basic.

As the WTE BA aggregate and/or aggregate fraction in the aqueous solution cures, regions of low solubility within the aggregate and/or aggregate fraction can be created for heavy metals (such as Sb, Al, and Pb) contained within the aggregates and/or aggregate fraction. Water in or added to the aqueous suspension can also create a washing effect and decrease the concentration of other contaminants (such as molybdenum, Mo and chloride, $Cl^-$) in the WTE BA. It may be possible to base the endpoint for curing WTE BA in an aqueous suspension as herein described by changes in concentrations of the heavy metals and contaminants in the WTE BA aggregates or aggregate fraction or the aqueous suspension.

WTE BA aggregates can be reacted with carbon dioxide ($CO_2$) so that the WTE aggregate fraction or WTE BA aggregates within an aggregate fraction are carbonated. Carbonation of the aggregates can reduce hydrogen gas formation or other detrimental effects of the WTE BA aggregates in materials related to road construction.

A WTE BA aggregate fraction as described herein can be used in road construction as a part of granular base course. In an example, a WTE BA aggregate fraction used as a partial aggregate replacement in granular base course has a total Al content of about 25,000 mg/kg (dry) or less and the WTE BA aggregate fraction contains WTE BA aggregates sized from about 9.5 mm to about 19.05 mm. In an embodiment, a WTE BA aggregate fraction as described above or otherwise herein is aged in a lined unit with water as an aqueous solution until the pH of the aqueous solution is about 10.5 or about pH 8.0 to about pH 11.0, and then is used as a granular base course. In an embodiment, a WTE BA aggregate fraction as described above or otherwise herein is reacted with $CO_2$ from a $CO_2$ source and then used as a granular base course.

Figures 13, 14:
FIG. 13 depicts an example of asphalt roadway construction.
FIG. 14 depicts embodiments of mix design of ash-amended pavements.

WTE BA aggregates can be mixed with tricalcium silicate, dicalcium silicate, tricalcium aluminate, tetracalcium aluminoferrite, free calcium oxide, sulfur trioxide, and/or gypsum to form a PCC mixture. In an example, WTE BA aggregates or WTE BA aggregate fractions as described herein can be mixed with cement type I/II, lime rock, sand, and water to form a PCC mixture. In an embodiment, the PCC mixture as previously described can be admixed with coal fly ash. In an embodiment, coal fly ash is admixed with the PCC mixture at about 2% to about 4% or about 2.63% of the total PCC mixture by weight. FIG. 14 shows an embodiment of a PCC mixture according to the present disclosure. In an example, WTE BA aggregates or WTE BA aggregate fractions as described herein can be mixed with cement type I/II, crushed stone, sand, and water to form a PCC mixture. In an example, WTE BA aggregates or WTE BA aggregate fractions as described herein can be mixed with cement type I/II, gravel, sand, and water to form a PCC mixture. In an example, WTE BA aggregates or WTE BA aggregate fractions as described herein can be mixed with cement type I/II, recycled concrete aggregate, sand, and water to form a PCC mixture. In an embodiment, silica fume is admixed with the PCC mixture at about 0.5% to about 1.5% or about 0.8% of the total PCC mixture by weight.

WTE BA aggregates can be mixed with RAP, course aggregate, screenings, and sand to form a HMA mixture. Examples of asphalt mixes and mix properties according to the present disclosure can be seen in FIGS. 15(a) and 15(b). WTE BA aggregates can be mixed with course aggregate, screenings, and sand to form a HMA mixture. WTE BA aggregates can be mixed with recycled asphalt pavement (RAP), gravel, screenings, and sand to form a HMA mixture. WTE BA aggregates can be mixed with RAP, crushed stone, screenings, and sand to form a HMA mixture. WTE BA aggregates can be mixed with RAP, lime rock, screenings, and sand to form a HMA mixture. WTE BA aggregates can be mixed with RAP, lime rock, and sand to form a HMA mixture. WTE BA aggregates can be mixed with RAP, gravel, and sand to form a HMA mixture. WTE BA aggregates can be mixed with RAP, crushed stone, and sand to form a HMA mixture.

In embodiments, PCC or HMA mixtures can be formed with a WTE BA aggregate fraction having a total Al content about 25,000 mg/kg (dry) or less, and the WTE BA aggregate fraction contains WTE BA aggregates sized between about 9.5 mm to about 19.05 mm. PCC or HMA mixtures can be formed according to the embodiments above, where the WTE BA aggregate fraction is also optionally aged in a lined unit in an aqueous suspension until the aqueous suspension has a pH of about 11 or less basic. PCC or HMA mixtures can be formed according to the embodiments above, wherein the WTE BA aggregate fraction is also reacted with $CO_2$ from a $CO_2$ source. A $CO_2$ source as described herein can be the atmosphere.

PCC or HMA can include a WTE BA aggregate fraction as described herein at about 50% or less of the total mixture. A WTE BA aggregate fraction can be about 0.001% to about 50% of the total mixture in PCC or HMA. A WTE BA aggregate fraction can be about 5% to about 45% of the total mixture in PCC or HMA. A WTE BA aggregate fraction can be about 10% to about 40% of the total mixture in PCC or HMA. A WTE BA aggregate fraction can be about 15% to about 35% of the total mixture in PCC and HMA. A WTE BA aggregate fraction can be about 20% to about 30% of the total mixture in PCC or HMA. A WTE BA aggregate fraction can be about 25% of the total mixture in PCC or HMA.

Optionally, a WTE BA aggregate fraction as described herein can be admixed with coal fly ash in compositions for road construction, such as PCC and/or HMA, and the WTE BA aggregate fraction admixed with coal fly ash can be non-aged or aged, and optionally reacted with $CO_2$. Coal fly ash admixed with WTE BA for PCC or HMA can have the following specifications: a total mineral composition of $SiO_2$, $Al_2O_3$, and $Fe_2O_3$ greater than 70% by mass, maximum $SO_3$ content of 4.0% (by mass), maximum moisture content of 3%, and maximum loss on ignition of 6%. In accordance with ASTM C618 the physical requirements for Class F coal fly ash include: <34% of the material retained on a 45 um (No. 325) sieve when wet-sieved (with a variation of less than 5% points from average). A strength activity index (done in accordance with ASTM C311) of 75% or greater when compared to the control cements at 7 and 28 days, and a water requirement of less than 105% of the control.

Also described herein is a method for altering the elemental composition of WTE BA. The method can be comprised of the steps of separating WTE BA with one or more separation devices. In an embodiment, WTE BA can be separated with a separation device that removes WTE BA aggregates and/or particulates smaller than about 9.5 mm to produce an aggregate fraction. The separation device can be a ⅜ inch sieve. The aggregate fraction can then be separated with a second separation device to remove WTE BA aggregates and/or particulates about 19.05 mm in seize or greater. WTE BA separation can reduce to the total Al content of the resulting WTE BA aggregate fraction to less than 25,000 mg/kg (dry) or less than 14,200 mg/kg (dry). In another embodiment, the order of the separation steps are be reversed.

In an embodiment, the aggregate fraction that remains after separation can be reacted with $CO_2$ from a $CO_2$ source to further alter the composition. The $CO_2$ source can be the atmosphere. In another embodiment, the aggregate fraction that remains after separation can be aged to further alter the composition by placing the aggregate fraction in a lined unit and mixing the aggregate fraction with water to form an aqueous suspension. The WTE BA aggregate fraction can remain in the aqueous mixture in the lined unit until the pH of the aqueous suspension is about 10.5 or about pH 7.0 to about pH 11.0.

The resulting WTE BA aggregate fraction can then be used in road construction, either as a granular base course or in PCC or HMA or other materials as described herein, with or without the optional $CO_2$ reaction steps or aging steps.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

1.0 Introduction

It is well known that waste-to-energy (WTE) bottom ash (BA) represents a potential material for inclusion into the circular economy and that this resource is underutilized in many parts of the world [1]. Many uses for WTE BA have focused on reuse as a component in roadway construction projects including: the use of WTE BA as a roadway base course [1-4] or as an aggregate replacement in hot mix asphalt (HMA) or Portland cement concrete (PCC) pavements [5-10]. The use of recycled WTE BA as a road base course can result in the release of relatively small amounts of certain trace elements into the environment [2, 3, 11]. Additionally, because heavy metals are enriched in the ash during the combustion processes, total concentrations of certain trace elements have been found to exceed risk-based concentration thresholds for direct human exposure (depending on the thresholds used) [1, 12, 13].

One avenue to mitigate some of the potential concerns (leaching and direct human exposure risks) related to the beneficial use of WTE BA in roadway construction projects is to encapsulate the material inside an asphaltic or concrete matrix. Encapsulation of WTE BA and other similar combustion residues has been demonstrated to decrease contaminant leaching into the environment [6, 8, 14, 15] and to reduce direct human exposure risk by minimizing the opportunity for contact. Research has illustrated that the use of WTE BA as a partial aggregate replacement in HMA [7, 8, 14, 16-21] and PCC [5, 6, 9, 10, 22] is feasible. However, studies have pointed to possible deleterious effects when the material is added in high replacement quantities (> approximately 30%). These effects include an increase in binder content when the material is added to HMA [8, 17, 18] and hydrogen gas generation, resulting in spalling and decreased compressive strength, when added to PCC [9, 10, 22].

The risk of contamination to water supplies from a waste material is typically assessed using a leaching test. Batch leaching tests provide essential information on contaminant release from size-reduced waste materials, but are often considered a conservative estimate of trace element leaching from a waste placed as part of a large, semi-impermeable monolith (such as a pavement) [23, 24]. Test methods have been developed to better assess element release from waste materials in these forms [23, 25]; these tests allow for the measurement of the time dependent release of elements and the calculation of observed elemental diffusivity [23, 25]. Monolithic leaching tests have been used by a number researches to evaluate trace element mobility from waste materials that have been encapsulated with asphalt or cement [15, 26-30].

In an effort to further the body of scientific knowledge related to WTE ash reuse, a pilot project was conducted for a municipality in Florida during the summer of 2014. This project involved the construction of a series of roadway test strips, two of which incorporated WTE BA as a partial aggregate replacement in pavements (one in HMA and one in PCC). Control tests strips were constructed using the same mix designs except that virgin construction materials were used for the portion of the aggregate previously replaced with ash. This provided the research team with the unique opportunity to sample ash-amended and control pavements (both HMA and PCC) produced at full scale batch plants using the same base mix design. Additionally, it allowed for the comparison of element release between HMA and PCC. Although comparisons have been made between ash-amended and control pavements (HMA or PCC) this study represents a novel contribution in comparing the relative degree of encapsulation between the two pavement types Samples of both the control and ash-amended HMA and PCC were taken during the pilot project; batch and monolithic leaching tests and total environmentally available element composition were conducted. This data was used to quantify the relative risk posed by these materials when placed as a pavement, as well as assess any increased leaching risk that might occur when the material was crushed (a common method of recycling HMA and PCC). A comparison of the element release from the ash-amended pavements to the pavements constructed with the virgin materials was performed to assess whether any of the constituents of potential concern (COPC) were a consequence of the inclusion of the WTE BA into the pavement structure. The leachability index (LI), an indicator of the mobility of trace elements from a monolith (in a diffusion controlled scenario), was calculated for the pavements along with the observed elemental diffusivity. The results of this study provide valuable insight into contaminant release from ash-amended products and are of significance to parties (scientists, municipalities, regulators, and industry) interested in moving forward with ash reuse in these types of applications.

2.0 Materials and Methods 2.1 Facility Description, Sample Collection, and Pavement Design The ash used in the construction of the pilot scale roadway originated from a 1,000 ton per day, mass burn WTE facility in Florida, US. Following combustion, this facility employs both ferrous and non-ferrous metals recovery; this is conducted on solely the bottom ash (as opposed to metals recovery being conducted on the mixed ash stream, typical of many US WTE facilities). The result of this practice is an increased percentage of metals recovery; this is important as it is known that the fraction of metals contained in WTE ash can have a significant impact on its leachability [31].

A grain size distribution of the "as-used" ash, description of the ash processing, the HMA and PCC mix designs, and photographs of roadway construction are provided in the supplementary information (SI) section available following the references. Prior to use, the material was aged for a period of 2.5 months, representative samples were collected from the aging pile for characterization prior to production of the HMA and PCC. The screened BA was used as a 20% replacement of the course aggregate in the PCC mixture (13% by mass) and 20% of the aggregate in the HMA mixture (19% by mass). PCC samples were collected from each truck in accordance with ASTM C172 [32]. HMA samples were collected by coring the roadway at three locations (representing the beginning, middle and end of the pavements) approximately one week after placement.

2.2 Total Concentration

The total environmentally available concentration of the elements in the pavements and WTE BA were assessed using EPA method 3050b, five replicates of each material (PCC, HMA and BA) were tested. The digestion entails heating the samples at a constant temperature of 95±5° C. while adding nitric and hydrochloric acids, as well as hydrogen peroxide [33].

2.3 Leaching Tests

EPA method 1312, the synthetic precipitation leaching procedure (SPLP), was conducted on the HMA and PCC pavements as well as the WTE BA. The SPLP is a batch leaching test conducted at an "as is" liquid to solid (L/S) ratio of 20:1 with samples size reduced to pass a 9.5 mm sieve prior to testing; all SPLP testing was conducted on a homogenized sample representing samples either taken from all of the trucks (PCC) or cores from each of the three locations of the roadway (HMA), SPLP tests were conducted in triplicate.

Determination of mass flux and observed diffusivity from monolith leaching tests is an approach that has been used by a number of researches when evaluating COPC release from media where mobility would likely be to be governed by diffusion [e.g., a waste incorporated in concrete or treated with solidification/stabilization (S/S)] [27, 34-36]. A similar approach was included as a part of the US-EPA's new compendium of leaching tests and was used in this study [25]. EPA method 1315 (monolith test), was conducted on the intact HMA and PCC samples. Method 1315 is a tank test where an intact sample is submerged in a vessel with reagent water, and the water is renewed at set time intervals (0.08, 1.0, 2.0, 7.0, 14, 28, 42, 49, and 63 days), all method 1315 tests were conducted in triplicate [33]. The samples tested were cylindrical in shape, with a diameter of 10.16 cm and ranged in height from 9.52 to 10.16 cm for the PCC samples and 6.19 to 7.77 cm for the HMA samples. A liquid to exposed surface area ratio (L/SA) of 9±1 mL reagent water per cm$^2$ of pavement area was used throughout the method 1315 test.

The equations for the calculation of the cumulative mass release, flux, and observed diffusivity from the results of method 1315 can be found in the SI section. To calculate the observed elemental diffusivity for each interval ($D_i^{obs}$) from the pavement samples, an analytical solution derived from Crank (1975) [37] for diffusion from a cylinder into an infinite bath was used. The leachability index (LI) is calculated by taking the $-1*\log_{10}(D_i^{obs})$, where $D_i^{obs}$ is expressed in units of cm$^2$/s; wastes with a leachability index of <6.5 are considered to have high mobility, 6.5<L<8.0 moderate mobility, and L>8.0 limited mobility [28, 36, 38, 39].

2.4 Analytical Methods

Leachate samples were prepared for analysis by conducting an acid digestion in accordance with EPA Method 3010a [33] (Acid Digestion of Aqueous Samples and Extracts for Total Metals for Analysis by FLAA or ICP Spectroscopy). Following the digestion, all samples (leaching test extracts and total digestions) were analyzed for the following inorganic elements: Al, As, B, Ba, Be, Ca, Cd, Cr, Cu, Fe, K, Mg, Mn, Mo, Na, Ni, Pb, Sb, Se, Sn, Sr, V, and Zn using Inductively Coupled Plasma—Atomic Emission Spectrometry (ICP-AES) (Thermo iCAP 6200 Atomic Emission Spectrometer).

2.5 Risk Assessment Approach

Often times, as a mechanism of quantifying the relative risk associated with the beneficial use of a waste material, leachate concentrations are compared to regulatory thresholds. In this study, the Florida Groundwater Cleanup Target Levels (GCTL) were used as the regulatory threshold for comparison; many of these thresholds are set at the US primary drinking water standards. The GCTLs were not specifically developed for a beneficial use assessment, but do represent a conservative method for a screening analysis to identify COPC [40].

3.0 Results and Discussion 3.1 Batch Leaching Tests

Al, Mo, and Sb were the three elements which leached above GCTLs in the WTE BA and were identified as COPCs along with Pb, an element known to leach from fresh WTE BA due to its high pH [1]; the mean SPLP pH for the WTE BA was 10.97. Similarly Al, Mo and Sb were found to leach above their respective GCTLs in the SPLP for one or more of the pavement samples. The results of the SPLP tests are provided in FIG. 6.

The incorporation of the BA to the PCC did not cause any additional elements to leach above their respective risk thresholds. Mo, the only element with a health-based risk threshold found to leach above its GCTL, was present at higher concentrations in the control SPLP leachates than in the ash-amended leachates. Pb, an element known to be highly soluble in BA in the elevated pH range seen (11.5-12.0) [41] did leach; however, the measured concentrations were low, indicating that even when the material was size reduced, Pb (and other trace elements present in the BA) can be bound in the PCC matrix.

The total environmentally available concentrations of select elements (Al, Sb, Pb, Mo) in the pavements are reported in FIG. 7. The total concentrations, along with variations in pH between the PCC and HMA, help to elucidate differences in the SPLP tests.

Mo, found naturally in PCCs and known to be present as an oxyanion [42], was measured at a higher total concentration in the control PCCs (compared to the ash-amended PCCs). A higher concentration could likely have resulted in the increased leaching of Mo seen in the controls. Total concentrations of Al were found to be higher in the ash-amended PCC, as Al is known to be present in BA in significant quantities (as seen in FIG. 7) [43]. The speciation of the Al and other elements in the PCC could drive leaching along with concentration and pH, prior study has reported the formation of aluminum carbonate hydrates ($Ca_4Al_2O_6(CO_3)_{0.5} \cdot 12H_2O$; $Ca_8Al_4O_{14} \cdot 12H_2O$) [22] in WTE BA amended concrete which could be soluble at the pH values seen here.

Sb and Al can be found in concentrations above their respective GCTLs for the ash-amended HMA samples. Magee et al. (1999) found that the SPLP pH of ash-amended HMA (10.4) was approximately 0.4 pH points higher than that of controls [16]. The data here differed from what was observed in the previous study; however, a different ash sample was used and the natural pH of the control HMA (from Magee et al.) was elevated with respect to the natural pH seen here. In regards to the pH, it may be possible that the alkalinity of the BA can influence the leachate pH, as the SPLP of the WTE BA can be higher than the values measured for the HMA samples.

The ash-amended HMA was found to leach Al and Sb in different amounts than controls. Sb, present in the BA [44], was not detected in the totals analysis for the control pavements. Differences in Al leaching could be due to the difference in pH ($\approx 1.5$), which can create a more favorable environment for Al release.

The ash-amended HMA was found to leach in different amounts than the ash-amended PCC, even if the differences in ash replacement percentage were accounted for (HMA-19% PCC-13%, a 6% difference). For Sb, Sb release could be more favorable at a lower pH value [45]. The opposite may be true for Al however, as the pH observed for the PCCs could be more likely to facilitate Al release [41]. Because of this, it may be possible that there are other mechanisms which could potentially act to reduce leaching of the ash-amended PCC. The reactivity of BA when placed in PCC has been reported by a number of authors [5, 6, 9, 10], and these reactions could potentially chemically bind certain trace elements (such as Pb, which would be suitable to be released at pH of 12) within the PCC matrix. Additionally the permeability of PCC can be several orders of magnitude lower than that of HMA [46, 47], and therefore reduced leaching of elements due to a slower rate of moment of water within the material could be possible.

Batch leaching tests conducted on the ash-amended pavements indicated that certain COPC (Al, Mo, Sb) were found to leach above the regulatory risk thresholds used in this assessment. For the PCC pavements, the control samples were also found to leach concentrations of these elements above GCTLs, indicating that no additional COCPs were created by the inclusion of the BA. Ash-amended HMA did leach Sb, in concentrations less than an order of magnitude over its GCTL which was not seen in the control samples. The crushed material form used in the SPLP test would be a conservative method of estimating COPC release when the material is placed as a pavement, but may provide important data on element release if the pavement materials were to be crushed or milled for reuse or disposal. In these types of applications, appropriate considerations for the management of these residues would need to be taken into evaluation. Weathering of pavements over their lifetime would likely result cracking and an associated increase in exposed surface area. However, as the material would still be in a monolithic, instead of a granular form (e.g. a milled pavement) the calculated flux from the 1315 test (mass leached/area) could still be used as a input concentration provided the increase in exposed surface area (due to cracking) was accounted for appropriately.

3.2 Element Release from Monolithic Pavements

EPA Method 1315 was conducted to evaluate COPC release from the pavements in their intact form to: (i) quantify the differences in release between ash-amended PCC and HMA (ii) provide a comparison of the cumulative mass release [$M_{Cumu}$(mg-COPC/kg-dry-pavement)] between the monolith and the batch tests, (iii) assess the mechanisms of element release from the pavements (diffusion, dissolution), and (iv) determine the $D^{obs}$ and LI to quantify the release rates of diffusion controlled elements.

The pH of the control PCC concrete pavements (in the monolith test) began at a mean value of 10.25 (day 0.08) and decreased throughout the course of the test to a final pH of 8.65 (day 63); this was similar to the trend observed in the ash-amended PCCs, where the pH began at 10.20 (day 0.08) and decreased to a final pH of 8.85 (day 63). FIG. 8 presents the method 1315 pH and COPC leaching data for the PCC pavements. Similar to the results of the SPLP test Sb was not detected in any of the PCC samples despite the decrease in pH seen throughout the test. Sb may be well encapsulated in the PCC matrix. Pb was not measured in the method 1315 test, and the release of Pb from the batch tests could be related to the increased surface area of the PCC (due to size reduction) or the increased pH of the batch extractions.

FIG. 9 displays the pH and COPC concentrations for the HMA asphalt pavements. The pH values for the control and ash-amended HMAs became more acidic over time. The pH of the HMA pavements in the monolith test displayed a different trend seen for the HMA pavements in the SPLP; for the monolith test, the pH values for the ash-amended and control samples were similar.

For both the control and ash-amended HMA, the concentrations of Al were found to be above the GCTL in all instances. Leached Al concentrations were higher for the ash-amended HMA with respect to the control; however, the large discrepancy in leached concentrations (over an order of magnitude) between the control and ash amended samples (seen in the SPLP) was not observed in the monolith test. The pH differences between the monolith and SPLP test could be one of the factors that resulted in lower concentrations of Al leached in the monolith test. Similarities in pH between the ash-amended and control monoliths highlight that other factors besides pH (i.e. the concentrations of Al contained in the samples and potentially the speciation of the Al in the pavement) may contribute to the increased Al leaching seen in the ash-amended HMA. Concentrations of Sb in the ash-amended samples were found to be above the GCTLs for half of the leaching intervals (FIG. 9). As a general trend, leached concentrations of Sb increased over time. For all of the leaching intervals, Sb concentrations were within the same order of magnitude as the GCTL. Mo and Pb leaching from the ash amended HMA was similar to the results seen in the SPLP extractions, Pb was found to leach below detection limits in all intervals and Mo was measured in low concentrations throughout the course of the tests.

3.2.1 Cumulative Mass Release in Batch and Monolith Testing

Figure 3:
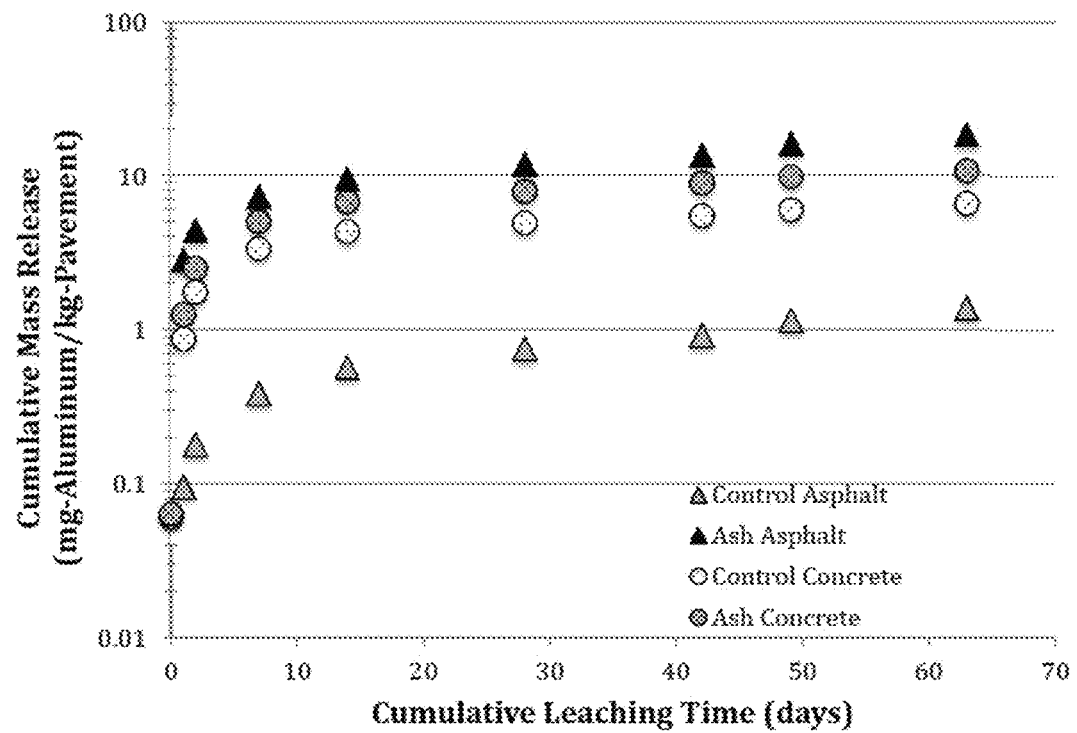
FIG. 3 shows aluminum (Al) cumulative mass release in method 1315.

FIG. 3 presents the $M_{Cumu}$ of Al for the ash-amended and control pavements (HMA and PCC) in Method 1315. For comparison, the cumulative mass release (mg/kg) from the SPLP tests is provided in FIG. 6.

The cumulative release of Mo from the PCCs in Method 1315 was found to be similar (0.262 mg/kg—ash-amended, 0.255 mg/kg—control) for both of the pavements (ash and control); this data, along with the data seen in the SPLP test, suggest that the leaching of Mo may primarily be from components of the PCC and not a result of the addition of the BA into the PCC matrix. Previous study on the leaching of recycled PCC aggregate (RCA) by Engelsen et al., (2010) found Mo release (in the same pH region observed here) to be within the same order of magnitude as the values measured in the monolith leaching test [42].

Sb $M_{Cumu}$ from the monolithic sample (0.172 mg/kg) was again different than the SPLP test (0.701 mg/kg), despite a lower pH that might be more conducive to the leaching of Sb as an oxyanion. In all instances, leaching the pavements in their monolithic form can result in a substantial reduction in element release in comparison to the batch tests. A large pH difference was not seen for the monolith; this may be one factor that resulted in less of a difference in $M_{Cumu}$ between the ash-amended and control HMAs. The similarity in the measured pH values for both the HMA samples could be related to the fact that the BA is encapsulated during the monolith test, while once the sample is size-reduced (for the SPLP), a portion of the BA could become exposed resulting in the observed increase in pH.

3.2.2 Release Mechanisms for COPC in HMA and PCC Pavements

The results of Method 1315 demonstrate that the release of COPC from the pavements could be markedly reduced if the materials were contacted with water in their monolithic form. To determine the release mechanisms for the COPC present, an approach developed by De Groot and Van der Sloot was employed [48]. Similar approaches have been used to evaluate the release mechanisms for a number of stabilized waste produces [28, 36, 38].

First, a graph of the $M_i$ and the cumulative leaching time was plotted on a log-log scale; next the slope of the line was determined through regression analysis. The slope was then used as an indicator of the leaching mechanism present; for diffusion to be indicated as the governing release mechanism, the slope of the line needs to fall between 0.35 and 0.65. A slope of greater than 0.65 indicates dissolution, while a slope less than 0.35 indicates depletion as the dominant form of release [25, 38, 48]. The first leaching interval (0.08 days) was omitted from the regression analysis as it was not conducted for all of the pavement types.

Figure 4:
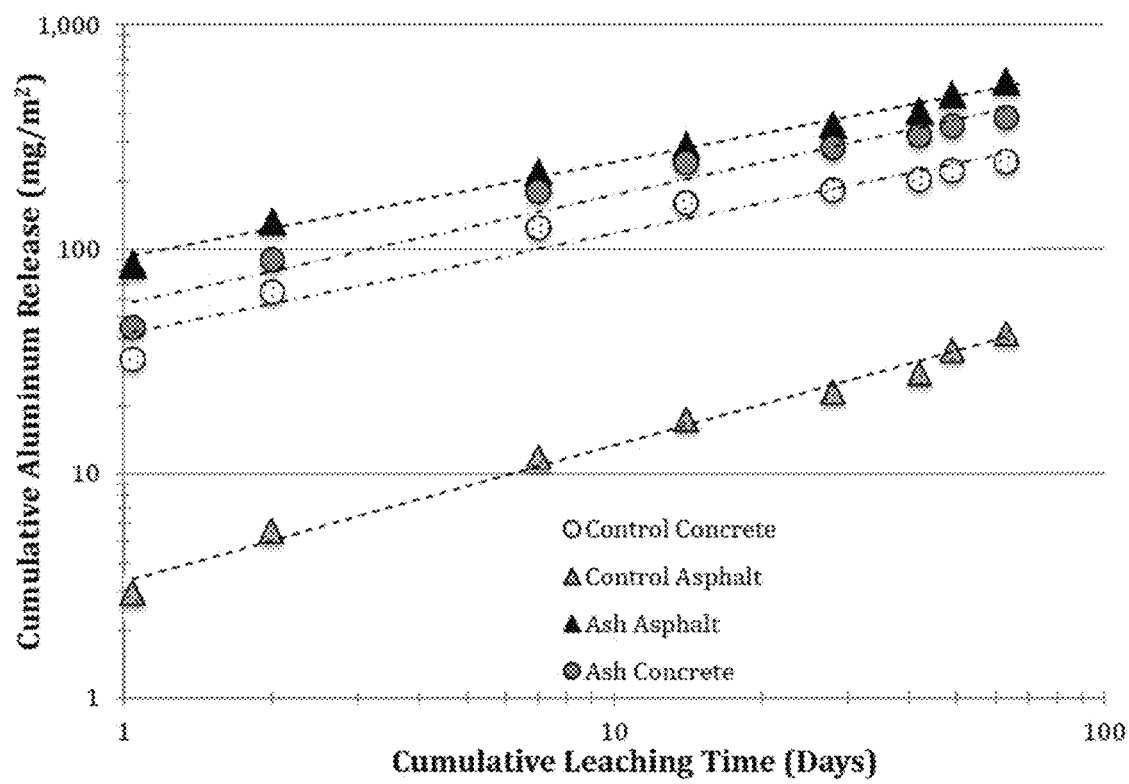
FIG. 4 depicts a log-log comparison of the cumulative release of Al (mg/m²) and leaching.

FIG. 4 presents the log-log comparison of $M_i$ and the cumulative leaching time for Al release from the PCC pavements. The slope of lines and the $R^2$ values are indicated in the figure. In all instances, the $R^2$ values were greater than 0.94, indicating a good fit of the regression to the measured data points. For all of the pavements tested (HMA and PPC), the release mechanism for Al may be indicated as diffusion; Sb release from ash-amended HMA may also be found to be governed by diffusion ($R^2$=0.991, Slope-0.519). Shown in FIG. 5 is the log-log comparison and regression analysis for Mo release from the PCC pavements. For both the ash-amended and control pavements, depletion could be the dominate release mechanism, as the slopes of both lines were less than 0.35. These result supports that Mo release may be related to components in the PCC. The release of Mo can be found to be governed by depletion from the material, and not by the diffusion of the element through the PCC matrix. Galvin et al. (2014) evaluated leaching of concrete produced with recycled aggregates and found the slope in the later stages of a tank leaching test to be similarly governed by depletion [49]. If Mo release were to be attributed to the inclusion of the BA, it may be expected to be released through diffusion, as the BA is encapsulated within the PCC matrix.

Diffusion can be the primary release mechanism for waste materials encapsulated in PCC or treated with S/S [28, 30]. This can support the trends seen for Al in all pavement types as the inclusion of the BA was not found to change the dominant release mechanism in any instance. There are limited data available related to the release mechanisms for waste materials encapsulated in HMA pavements. It is important to note that the slope of the regression line for the control and ash amended HMA did increase from 0.42 (control) to 0.606 (ash-amended HMA). This is consistent with the increased LI seen for the ash-amended HMA and could suggest that other WTE BA samples could potentially result in a change to the Al release mechanism present. Release due to diffusion, seen for Sb (in the ash-amended HMAs) illustrates that Sb mass transfer can occur by the migration of Sb through the pore structure of the HMA (driven by a concentration gradient), the dominant mechanism of constituent release that can be present in other methods of waste encapsulation.

3.2.3 Observed Diffusivity ($D_i^{obs}$) and Leachability Index (LI)

FIG. 10 presents the min, max, and mean values of the LI and $D_i^{obs}$ for Al and Sb for the ash-amended HMA. The diffusion coefficients for Sb in the ash-amended HMA pavements ranged from $1.66 \times 10^{-10}$ to $2.87 \times 10^{-9}$ cm$^2$/s, when classified using the LI these values fell between 8.5 and 9.75. Based on the results of the LI the mobility of Sb in the HMA can be characterized as low (LI>8).

Although both of the LI's (ash-amended and control HMAs) indicated that Al release from diffusion may be limited, there was an observable increase related to the addition of the BA. These results support that the inclusion of the BA (into the HMA) can facilitate an increase in Al release and mobility. For the PCC pavements the LI and $D_i^{obs}$ values did not vary dramatically between the ash-amended and control samples with mean values on the order of $(1 \times 10^{-12}$ cm$^2$/s). Therefore, the diffusivity of Al in the PCC matrix may not be substantially affected by the BA addition.

The calculated Lis for the COPCs were found to be below the threshold for low mobility. With respect to Sb, this supports the results of the Method 1315 test, which indicate that the release of Sb into the environment could be limited when material is in its monolithic form. Al mobility was also low, however, differences in LI and $D_i^{obs}$ were observed between the ash amended and control HMAs, supporting the difference in cumulative Al release can be seen in the monolith leaching test.

4.0 Conclusions

Overall, encapsulation of the BA in the PCC matrix proved encapsulation can be a suitable method of reducing the leachability of COPC from the ash. HMA samples amended with WTE BA can exhibit a certain degree of leaching, however, results from this study support that when in its monolith form, element mobility from the pavements could be very limited. It is important to note that all leaching tests are designed as tools to determine the magnitude of aqueous release for a particular media (e.g. WTE amended pavement). These concentrations can then be used in a fate and transport evaluation to assess environmental risk, which could be heavily dependent on the site hydrogeologic conditions (e.g. aquifer depth and thickness) and construction practices. Therefore, it is recommended that this type of evaluation be conducted, prior to beneficial use of these materials in practice. This study illustrates that both PCC and HMA used as a partial aggregate replacement in pavement construction can encapsulate potential COPC within the pavement matrices to some degree.

REFERENCES

[1] C. C. Wiles, Municipal solid waste combustion ash: State-of-the-knowledge, J. Hazard. Mater. 47 (1996) 325-344.

[2] D. Dabo, R. Badreddine, L. De Windt, I. Drouadaine, Ten-year chemical evolution of leachate and municipal solid waste incineration bottom ash used in a test road site, J. Hazard. Mater. 172 (2009) 904-913.

[3] L. De Windt, D. Dabo, S. Lidelöw, R. Badreddine, A. Lagerkvist, MSWI bottom ash used as basement at two pilot-scale roads: comparison of leachate chemistry and reactive transport modeling, Waste Manage. 31 (2011) 267-280.

[4] R. Forteza, M. Far, C. Segui, V. Cerda, Characterization of bottom ash in municipal solid waste incinerators for its use in road base, Waste Manage. 24 (2004) 899-909.

[5] R. Cioffi, F. Colangelo, F. Montagnaro, L. Santoro, Manufacture of artificial aggregate using MSWI bottom ash, Waste Manage. 31 (2011) 281-288.

[6] O. Ginés, J. Chimenos, A. Vizcarro, J. Formosa, J. Rosell, Combined use of MSWI bottom ash and fly ash as aggregate in concrete formulation: environmental and mechanical considerations, J. Hazard. Mater. 169 (2009) 643-650.

[7] N. W. Garrick, K. Chan, Evaluation of domestic incinerator ash for use as aggregate in asphalt concrete, Transp. Res. Rec. (1993).

[8] C. Huang, C. Chiu, K. Li, W. Yang, Physical and environmental properties of asphalt mixtures containing incinerator bottom ash, J. Hazard. Mater. 137 (2006) 1742-1749.

[9] U. Müller, K. Rübner, The microstructure of concrete made with municipal waste incinerator bottom ash as an aggregate component, Cem. Concr. Res. 36 (2006) 1434-1443.

[10] J. Pera, L. Coutaz, J. Ambroise, M. Chababbet, Use of incinerator bottom ash in concrete, Cem. Concr. Res. 27 (1997) 1-5.

[11] O. Hjelmar, J. Holm, K. Crillesen, Utilisation of MSWI bottom ash as sub-base in road construction: First results from a large-scale test site, J. Hazard. Mater. 139 (2007) 471-480.

[12] C. Saranko, C. Halmes, K. Tolson, S. Roberts, Development of Soil Cleanup Target Levels (SCTLs) for Chapter 62-777, FA C, Center for Environmental & Human Toxicology, University of Florida: Gainesville FL (1999).

[13] US EPA OSWER, Supplemental Guidance for Developing Soil Screening Levels for Superfund Sites (2002).

[14] J. Chen, P. Chu, J. Chang, H. Lu, Z. Wu, K. Lin, Engineering and environmental characterization of municipal solid waste bottom ash as an aggregate substitute utilized for asphalt concrete, J. Mater. Civ. Eng. 20 (2008) 432-439.

[15] J. B. Hayes, J. Wang, J. G. Roessler, C. C. Ferraro, C. Wu, D. Deford, T. G. Townsend, Evaluation of leaching of trace metals from concrete amended with cement kiln baghouse filter dust, Resour. Conserv. Recycling. 94 (2015) 92-98.

[16] B. H. Magee, J. Hahn, C. M. Jones, G. Murata, Environmental testing of municipal solid waste ash-amended asphalt. Proceedings of the 1999 North American Waste to Energy Technical Conference, (1999) 103-118.

[17] V. Ogunro, H. Inyang, F. Hooper, D. Young, A. Oturkar, Gradation control of bottom ash aggregate in superpave bituminous mixes, J. Mater. Civ. Eng. 16 (2004) 604-613.

[18] C. N. Musselman, T. Taylor Eighmy, D. L. Gress, M. P. Killeen, The New Hampshire Bottom Ash Paving Demonstration US Route 3, Laconia, N. H. 16 (1994) 83-83.

[19] M. M. Hassan, H. A. Khalid, Compressive Deformation Behaviour of Asphalt Mixtures Containing Incinerator Bottom Ash Aggregate, Road Materials and Pavement Design. 11 (2010) 633-652.

[20] S. W. Goh, Z. You, A preliminary study of the mechanical properties of asphalt mixture containing bottom ash, Canadian Journal of Civil Engineering. 35 (2008) 1114-1119.

[21] S. W. Goh, Z. You, The Dynamic Modulus of Asphalt Mixture with Bottom Ash Aggregates (2008) 1008-1015.

[22] X. Qiao, B. Ng, M. Tyrer, C. Poon, C. Cheeseman, Production of lightweight concrete using incinerator bottom ash, Constr. Build. Mater. 22 (2008) 473-480.

[23] D. Kosson, H. Van der Sloot, F. Sanchez, A. Garrabrants, An integrated framework for evaluating leaching in waste management and utilization of secondary materials,
Environ. Eng. Sci. 19 (2002) 159-204.

[24] D. S. Apul, K. H. Gardner, T. T. Eighmy, A probabilistic source assessment framework for leaching from secondary materials in highway applications, Clean technologies and environmental policy. 5 (2003) 120-127.

[25] A. C. Garrabrants, S. A. Thorneloe-Howard, Background Information for the leaching environmental assessment framework (LEAF) test methods, US Environmental Protection Agency, Office of Research and Development, National Risk Management Research Laboratory, 2010.

[26] V. Bednarik, M. Vondruska, M. Koutny, Stabilization/solidification of galvanic sludges by asphalt emulsions, J. Hazard. Mater. 122 (2005) 139-145.

[27] F. Sanchez, C. Gervais, A. C. Garrabrants, R. Barna, D. S. Kosson, Leaching of inorganic contaminants from cement-based waste materials as a result of carbonation during intermittent wetting, Waste Manage. 22 (2002) 249-260.

[28] T. S. Singh, K. K. Pant, Solidification/stabilization of arsenic containing solid wastes using portland cement, fly ash and polymeric materials, J. Hazard. Mater. 131 (2006) 29-36.

[29] E. L. National Renewable, University of New Hampshire Environmental, Research Group, The Laconia, N. H. Bottom Ash Paving Project, National Renewable Energy Laboratory, Golden, CO, 1996.

[30] A. C. Garrabrants, D. S. Kosson, R. DeLapp, H. A. van der Sloot, Effect of coal combustion fly ash use in concrete on the mass transport release of constituents of potential concern, Chemosphere. 103 (2014) 131-139.

[31] W. N. Oehmig, J. G. Roessler, J. Zhang, T. G. Townsend, Effect of ferrous metal presence on lead leaching in municipal waste incineration bottom ashes, J. Hazard. Mater. 283 (2015) 500-506.

[32] ASTM International, Standard Practice for Sampling Freshly Mixed Concrete, ASTM (2014).

[33] US EPA, Test Methods for Evaluating Solid Waste, Physical/Chemical Methods, sw846 (2014).

[34] D. Kosson, H. Van der Sloot, F. Sanchez, A. Garrabrants, An integrated framework for evaluating leaching in waste management and utilization of secondary materials, Environ. Eng. Sci. 19 (2002) 159-204.

[35] F. Sanchez, C. Mattus, M. Morris, D. Kosson, Use of a new leaching test framework for evaluating alternative treatment processes for mercury-contaminated soils, Environ. Eng. Sci. 19 (2002) 251-269.

[36] D. Dermatas, D. H. Moon, N. Menounou, X. Meng, R. Hires, An evaluation of arsenic release from monolithic solids using a modified semi-dynamic leaching test, J. Hazard. Mater. 116 (2004) 25-38.

[37] J. Crank, The mathematics of diffusion (1975).

[38] J. Torras, I. Buj, M. Rovira, J. de Pablo, Semi-dynamic leaching tests of nickel containing wastes stabilized/solidified with magnesium potassium phosphate cements, J. Hazard. Mater. 186 (2011) 1954-1960.

[39] V. Dutré, C. Kestens, J. Schaep, C. Vandecasteele, Study of the remediation of a site contaminated with arsenic, Sci. Total Environ. 220 (1998) 185-194.

[40] Florida Department of Environmental Protection, Florida Groundwater and Surfacewater Cleanup Target Levels F.A.C 62-777.

[41] J. A. Meima, R. N. Comans, Geochemical modeling of weathering reactions in municipal solid waste incinerator bottom ash, Environ. Sci. Technol. 31 (1997) 1269-1276.

[42] C. J. Engelsen, H. A. van der Sloot, G. Wibetoe, H. Justnes, W. Lund, E. Stoltenberg-Hansson, Leaching characterisation and geochemical modelling of minor and trace elements released from recycled concrete aggregates, Cem. Concr. Res. 40 (2010) 1639-1649.

[43] J. A. Meima, R. N. Comans, Application of surface complexation/precipitation modeling to contaminant leaching from weathered municipal solid waste incinerator bottom ash, Environ. Sci. Technol. 32 (1998) 688-693.

[44] G. Cornelis, C. A. Johnson, T. Van Gerven, C. Vandecasteele, Leaching mechanisms of oxyanionic metalloid and metal species in alkaline solid wastes: A review, Appl. Geochem. 23 (2008) 955-976.

[45] G. Cornelis, T. Van Gerven, C. Vandecasteele, Antimony leaching from uncarbonated and carbonated MSWI bottom ash, J. Hazard. Mater. 137 (2006) 1284-1292.

[46] K. Kanitpong, C. H. Benson, H. U. Bahia, Hydraulic conductivity (permeability) of laboratory-compacted asphalt mixtures, Transportation Research Record: Journal of the Transportation Research Board. 1767 (2001) 25-32.

[47] S. H. Kosmatka, W. C. Panarese, Portland Cement Association, Design and control of concrete mixtures (2002).

[48] G. J. de Groot, van der Sloot, Hans A, Determination of leaching characteristics of waste materials leading to environmental product certification, ASTM Spec. Tech. Publ. (1992) 149-170.

[49] A. P. Galvin, F. Agrela, J. Ayuso, M. G. Beltrán, A. Barbudo, Leaching assessment of concrete made of recycled coarse aggregate: Physical and environmental characterization of aggregates and hardened concrete, Waste Manage. 34 (2014) 1693-1704.

SI Section 1: Supplementary Information Related to Materials and Methods

SI Section 1.1 WTE Ash Processing Information

Figure 11:
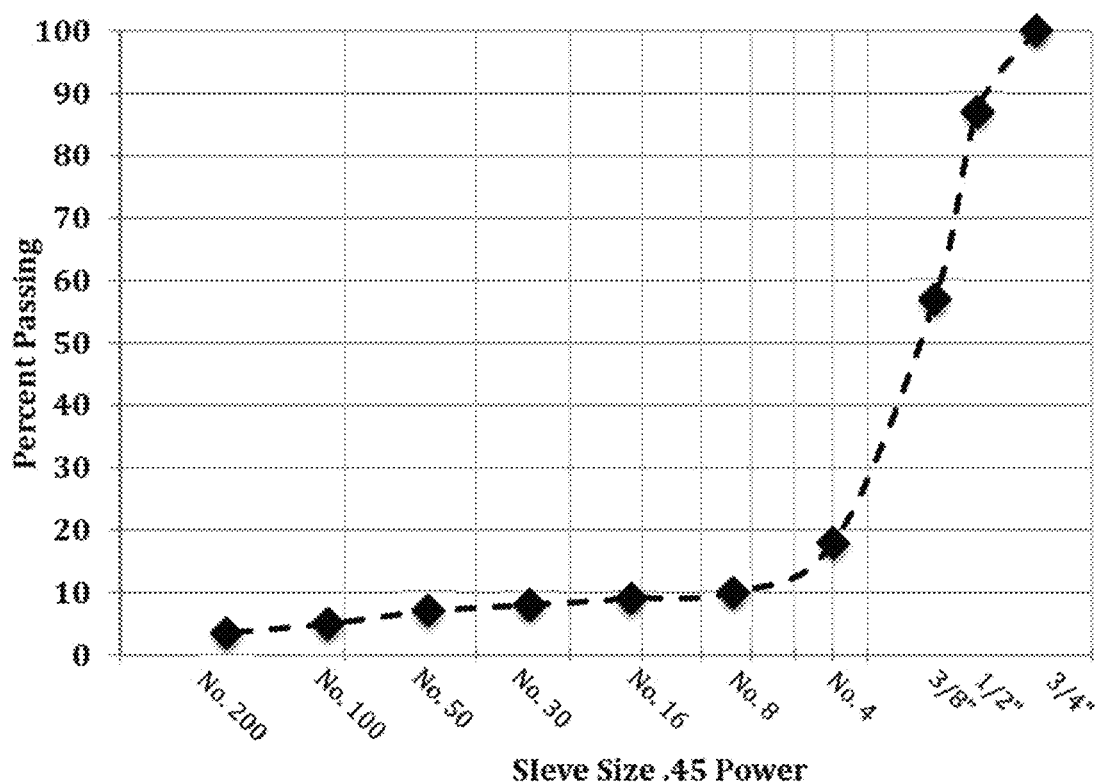
FIG. 11 shows grain size distribution of WTE bottom ash (WTE BA) used in embodiments of pavement samples.
Figure 12:
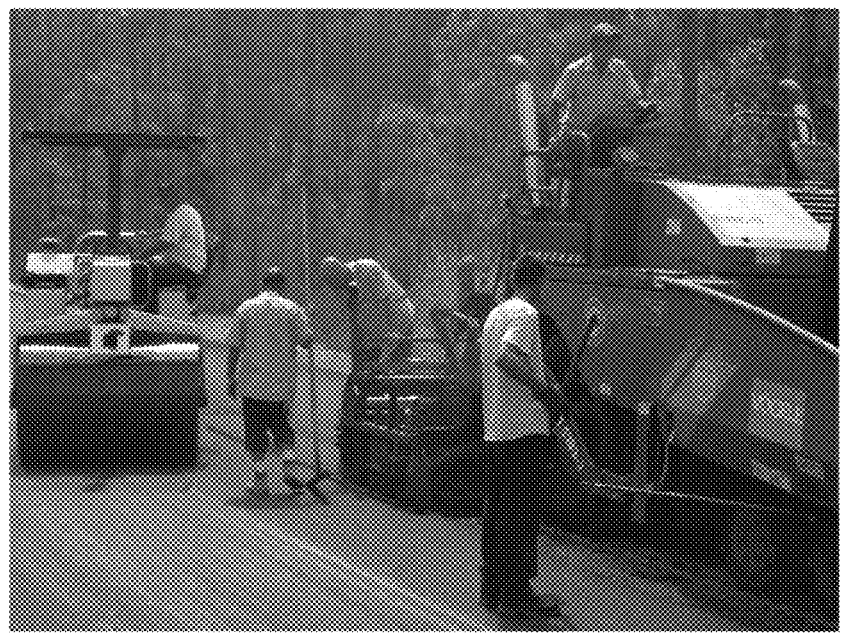
FIG. 12 depicts an example of roadway construction.

The BA sample used to produce the ash-amended pavements can be screened within the facility to remove any materials smaller than 9.5 mm, then further screened to remove particles greater than 19.05 mm. This can be performed so that the ash can achieve the appropriate gradation for use in HMA, and to help mitigate issues related to hydrogen gas formation in PCC. An example of grain size distribution according to the present compositions and methods can be seen in FIG. 11. Examples of roadway construction using the present compositions and methods can be seen in FIGS. 12 and 13. Embodiments of PCC and HMA mixtures using compositions and methods as described herein can be seen in FIGS. 14, 15(a), and 15(b).

SI Section 1.2 Equations Used to Calculate Release from Method 1315

The cumulative mass release ($M_{Cumu.}$-mg-element/kg-pavement) of elements from the monoliths were calculated using Equation 1 below where: $M_{Cumu.}$ is equal to the sum of the measured leachate concentrations at each time interval ($C_i$-mg/L) multiplied by the volume of the tank ($V_{tank}$) and divided by the dry mass ($m_{dry}$) of the pavement sample. The elemental mass flux of the monoliths was calculated using Equations 2 and 3 below. First the mass release per exposed surface area ($M_i$) of each collection period was determined using Equation 2 below where: $V_{tank}$ is the volume of the extraction solution in the tank (C and SA have been previously defined). $M_i$ was then divided by the interval leaching time (seconds) to calculate the flux, as shown in Equation 3 below. To calculate the observed elemental diffusivity from the pavement samples, an analytical solution derived from Crank (1975) [37] for diffusion from a cylinder into a infinite bath (of zero concentration) was used (Equation 4, as shown below). In addition to variables that have been previously defined ($M_i$, t), the dry density of the sample (p), and the initial concentrations of the trace elements ($C_0$—determined using EPA Method 3050b and the approach in Section 2.2) were used in the calculation. $C_0$ concentrations can be found in FIG. 7, and are discussed previously. The dry density and exposed surface area values for the pavements are provided in the SI section. For each pavement, the $D_i^{obs}$ was calculated for each leaching interval; a minimum, maximum, and mean value were then obtained and these were used to calculate three values for the LI. Pavement dry density and exposed surface area data according to embodiments of the present disclosure and EPA method 1315 can be seen in FIG. 16. Data relating to leached elements in SPLP and total concentrations of leached elements in SPLP test in embodiments of the present disclosure can be seen in FIG. 17. FIG. 18 shows the total environmentally available concentrations of trace elements in embodiments of ash-amended and control pavements according to the present disclosure.

Equations $$M_{cumu.} = \Sigma \left[ C_{sample} * \frac{V_{tank}}{m_{dry}} \right] \quad \text{Eq. 1}$$

$$M_i = \left[ \frac{C_i * V_{tank}}{SA} \right]^{.5} \quad \text{Eq. 2}$$

$$F_i = \frac{M_i}{T_i - T_{i-1}} \quad \text{Eq. 3}$$

$$D_i^{obs} = \pi \left[ \frac{M_i}{2\rho C_0 (\sqrt{t_i} - \sqrt{t_{i-1}})} \right]^2 \quad \text{Eq. 4}$$

Example 2

1.0 Introduction

The beneficial use of waste-to-energy (WTE) bottom ash (BA) as a construction material has been a significant focus of civil and environmental researchers for the past several decades [1-7]. Because the particle size of the ash is similar to that of most conventional pavement aggregates, reuse in road construction projects is often cited as the most practical beneficial use application. In many countries, including the United States, WTE BA represents a relatively high volume material stream that is normally landfilled and could be acquired at a reasonably low cost. This provides an additional incentive for recycling [8]. The beneficial use of WTE BA in construction applications around the world have focused on use as a road base [9, 10] as well as the use of BA as an aggregate in Portland cement concrete (PCC). However use in PCC has been challenging in some instances as components within the ash can cause deleterious effects within the concrete matrix to some degree [6, 7, 11, 12].

Aging of WTE BA has been cited as a method of reducing the leaching of certain trace elements, particularly Pb, from the material prior to beneficial use. Because BA is heated and then rapidly cooled in a quench, it is classified as a meta-stable material and as the ash ages it reacts with atmospheric carbon dioxide to produce new mineral forms. WTE bottom ash is known to contain large percentages of Ca by mass (5.0-10%), carbonation of WTE bottom ash can occur through the reaction of atmospheric $CO_2$ with Ca in the bottom ash, resulting in the production of calcite ($CaCO_3$) [5, 8, 13]. Although aging the ash can be essential in creating in an environmentally stable product for reuse as a road base course, encapsulation within a PCC matrix can reduce the leaching of trace elements from WTE ash as well as other combustion residuals [14-16]. The logistical and operational costs associated with the aging of WTE BA could be significant when conducting a full-scale construction project; the concept of fully encapsulating WTE BA in concretes provide benefit, as many of the environmental concerns associated with use in an unencapsulated application (such as a road base) would be mitigated. Thus, the question has been posed as to the impacts (if any) the generation of these secondary mineral forms in the aging process might have on the material properties of the ash-amended product. One of the key concerns is that as the BA hydrates and produces these secondary mineral forms, the expansion of the ash within PCC could create stresses that result in cracking. Because relative amounts of many of the mineral forms present in fresh and aged WTE BA could differ, the impact of this on ash-amended concrete strength and durability can be assessed.

Some of the factors that have been cited as adverse effects related to the use of WTE BA in PCC include: decreased compressive strength, increased risk of alkali-silica reaction (ASR), and the formation of hydrogen gas. Reaction of metallic aluminum with the hydroxides contained in the Portland cement has been demonstrated to produce hydrogen gas; in a basic environment Al reacts to form aluminate ($AlO_2^-$) while liberating $H_2$ [6, 7, 11, 12, 17]. The voids formed by the gas have been shown to contribute to a decrease in the compressive strength of the material [7, 12]. Additionally, Muller and Rubner hypothesized that the one of the primary reasons for the degradation of the concrete amended with WTE BA was due to the reaction of deleterious (glass and aluminum) compounds in the ash. However, the concrete mixture used in the research, incorporated a relatively high water to cement ratio (W/C) (0.65) and did not utilize mineral admixtures, such as coal fly ash [12]. Accordingly, the mix used by Muller and Rubner was more susceptible to degradation due to the relatively high permeability (because of the elevated W/C) and the absence of mineral admixtures that are known to reduce permeability of concrete [18, 19].

The example herein investigates methods (e.g. use of mineral admixtures, size fractionation of ash) that could help reduce some of the problems associated with the use of WTE BA as a partial aggregate replacement in PCC. The impacts of aging of the ash itself, were evaluated through the use of a lab-scale accelerated carbonation process. Accelerated carbonation experiments simulate long-term ash exposure to atmospheric $CO_2$ over shortened time scales, and have been used by concrete researchers, as well as scientists examining the properties of waste combustion residues [20-22]. The occurrence of carbonation can be verified by measurement of the pH of the ash when immersed in water, as the alkaline calcium minerals are known to be depleted through carbonation resulting in a decrease in mineral pH [5, 23]. Compressive strength testing from ash-amended and control concretes was performed and surface resistivity and length change testing were conducted to evaluate the impact of WTE BA addition on the relative durability and reactivity of ash-amended concretes. These data are useful for engineers, scientists, and practitioners.

2.0 Materials and Methods 2.1 Ash Description and Sample Collection

WTE ash samples were collected from a 1,000 ton per day mass burn WTE facility in Florida, US. Two different size fractions of the BA were collected. The facility sampled utilized municipal solid waste from the surrounding communities as a feedstock, employs a moving grate type boiler for combustion, and operates at an approximate combustion temperature of 1,000° C. Both BA fractions were sampled following ferrous and non-ferrous metals recovery. The facility sampled, size-separates their BA in-process, using a 9.5 mm screen, following separation the material greater than 9.5 mm is passed through a conventional eddy current separator to recover non-ferrous metal. No advanced non-ferrous metal recovery technologies were employed on the fraction of the material finer than 9.5 mm. The two samples collected represent the fraction retained on the 9.5 mm screen and the fraction passing through it. A composite sample of each ash size fractions [less than 9.5 mm (LT-9.5) and greater than 9.5 mm (GT-9.5)], was generated for a period of 7 days. To produce the composite sample, sub-samples (of each size fraction) were collected every 30 min for 2 8-hour intervals each day. These 14 samples were then combined in a large baffled mixer and rotated for a period of 30 minutes to produce the composite sample (for each size fraction). The GT-9.5 ash was then further screened to remove any particles larger than 19.05 mm (since these particles may not be suitable for use in concrete applications). BA samples were then stored in sealed 19 L buckets until time of use. Following screening a totally environmentally available acid digestion was conducted on the ash flows to ascertain the concentration of aluminum in the bottom ash (mg/kg-dry). This acid digestion was conducted in accordance with EPA method 3050b, fourteen replicates of each sample were tested [24].

The coal fly ash employed as an admixture in the PCC was purchased from a local vendor, and previously sourced from a coal-fired power generation facility. The coal fly ash used conformed to all of the specifications for Class F coal fly ash outlined in ASTM C618 Standard Specification for Coal Fly Ash and Raw or Calcined Natural Pozzolan for Use in Concrete [25]. These specifications include: a total mineral composition of $SiO_2$, $Al_2O_3$, and $Fe_2O_3$ greater than 70% by mass, maximum $SO_3$ content of 4.0% (by mass), maximum moisture content of 3%, and maximum loss on ignition of 6%. In accordance with ASTM C618 the physical requirements for Class F coal fly ash include: <34% of the material retained on a 45 um (No. 325) sieve when wet-sieved (with a variation of less than 5% points from average), a strength activity index (done in accordance with ASTM C311) of 75% or greater when compared to the control cements at 7 and 28 days, and a water requirement of less than 105% of the control.

2.2 Aggregate Characterization, Concrete Batching, and Mix Design

The aggregates for the concrete and the WTE BA were evaluated for specific gravity, adsorption, and percent loss by Los Angeles abrasion (LA loss) in accordance with ASTMs C127 and C131 respectively [26, 27]. For the LA abrasion testing the number of charges and the particle size fractions tested are based on the initial particle size distribution of the aggregate being evaluated. For the GT-9.5 material a B grade (2.5 kg 19.05 mm-12.5 mm; 2.5 kg 12.5 mm-9.5 mm) was selected, as the LT-9.5 material had a finer particle size distribution, a C grade (2.5 kg 9.5 mm-6.35 mm; 2.5 kg 6.35-4.75 mm) was utilized.

Concrete specimens were prepared in the laboratory in accordance with ASTM C192. The course aggregate and 50% of the total volume of the mix water were first added to the mixer while stationary, the mixer was then started and the fine aggregate and cement added, finally the remaining 50% of the mix water was then added. The sample was then mixed for a period of 3 minutes, allowed to rest for 3 minutes, and then mixed for an additional two minutes. The sample was then discharged to a pan and remixed with a trowel to eliminate segregation. Both the (10.16 cm-dia× 20.32 cm-height) cylinder molds and the (152×152×559 mm) beam molds used for length change testing were compacted using a vibratory effort until large air bubbles were not visible. Samples were removed from all molds 24±8 hours after casting [28].

Figures 29, 30:
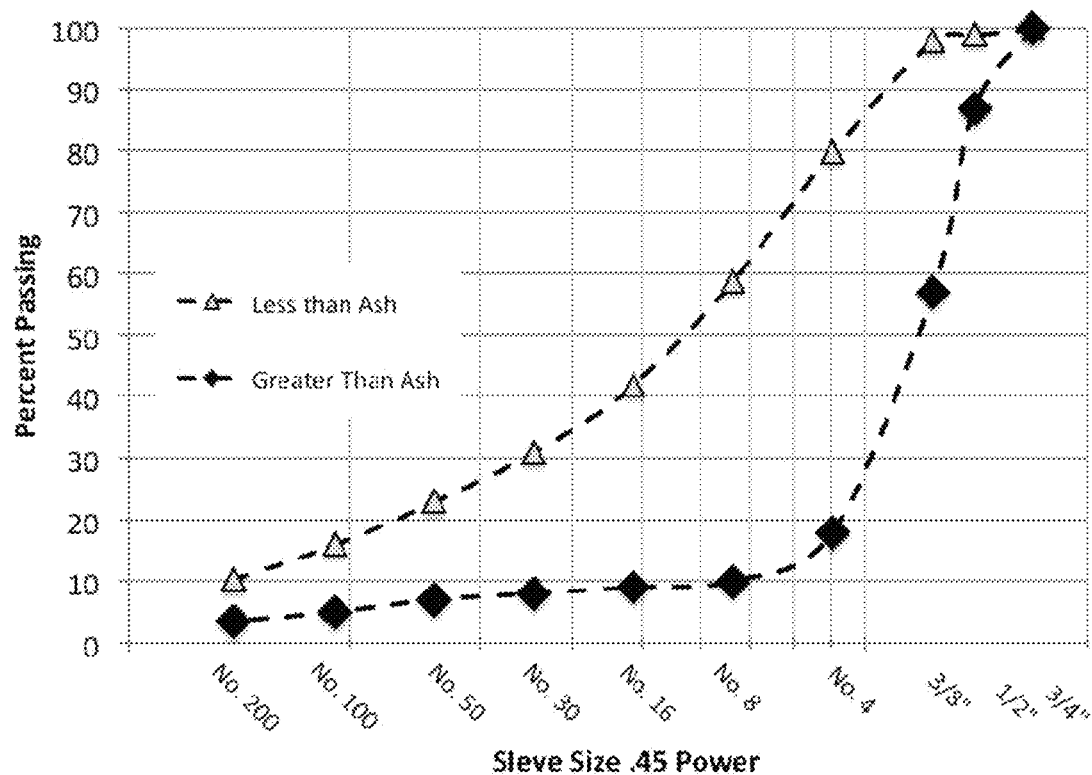
FIG. 29 depicts grain size distribution of LT-9.5 and GT-9.5 ash.
FIG. 30 shows mass percentage passing of ash through different sized sieves.

Control and ash-amended concrete specimens were produced using the same mix design (provided in FIG. 19), except that a portion of the coarse aggregate was replaced with WTE BA, and the volume of mix water was adjusted to account for differences in aggregate adsorption while preserving a constant w/c for each mix. A grain size distribution of both ashes is contained in FIGS. 29 and 30. The virgin aggregate used in the study was Florida lime rock, a typical aggregate used in concrete production in the southeastern U.S. The lime rock conformed to the gradation requirements of an American Association of State and Highway Transportation Officials (AASHTO) #57 stone, a table containing the gradation requirements for an AASHTO #57 stone is provided in the SI section below [29].

2.3 Concrete Compressive Strength Testing

All concrete tests were conducted in triplicate; 12 cylinder molds and three beam molds were produced for each of the concrete mixes. Subsequent to mixing, and the initial 24 hour curing period, the samples were immersed in a lime water $Ca(OH)_2$ curing solution per the requirements of ASTM C192 until the time of testing [28]. Compressive strength testing was conducted in accordance with ASTM C39 [30]. Compressive strength testing was performed on a hydraulic compression machine and run on laboratory batch specimens at ages of 3, 7, 28, and 56 days.

2.4 Accelerated Carbonation

Accelerated carbonation experiments were conducted on the GT-9.5 ash, because of the initial strength results of the mixtures produced using the LT-9.5 ash this sample was omitted from further testing. The pH of the ash when immersed in reagent-grade water (water with a measured resistivity of >18.2 MΩ·cm) was used as a surrogate indicator of carbonation. Numerous published studies have demonstrated that calcium species present in the WTE BA (portlandite, gibbsite, ettrinigite, calcite) control the pH, and that this pH is reduced through carbonation [5, 31]. The pH can be reduced as the species buffering the pH of the BA at highly alkaline values (portlandite, ettringite) are depleted during carbonation (transformed primarily to calcite). These reactions not only affect the geochemical structure but can decrease trace element leachability [5, 31]. Approximately 25 kg of the GT-9.5 ash was placed in a sealed chamber lined with low-density polyethylene. Perforated tubing was placed within the ash, to allow the $CO_2$ to diffuse through the material, and the chamber was filled with a 100% $CO_2$ atmosphere for a period of 4 days. The pH of the BA when immersed in reagent water was measured prior to (pH=10.5) and following carbonation (pH=9.1). This reduction in pH was used to demonstrate that carbonation of the BA had occurred. The exact amount of time that would be required for these pH changes to occur in a natural setting was not determined. However, other published literature indicates that the pH changes seen for the size fractions carbonated would be expected to occur over a number of months depending on the local conditions [23, 32]. Chimenos et. al found that the 6-16 mm size fraction of WTE BA from a Spanish WTE facility decreased from a pH of approximately 10.8 to a pH of 10.0 over the period of 170 days [32]. Arickx et al., (2006) found that the fine fraction of WTE BA (0.1-2 mm) decreased in pH from 12.1 to 10.7 after a period of three months of natural aging, and stated that three months was a sufficient time interval to decrease the pH of the 2-6 mm and 6-50 mm fractions to a value where elements would leach below Belgian standards (although the final pH values of the larger fractions were not reported) [23].

2.5 Concrete Length Change and Surface Resistivity

Concrete length change testing was conducted on the ash-amended and control PCC mixes to assess changes caused by factors other than applied external force or temperature. All concrete length change testing was completed in accordance with ASTM C157 [33]. Length change testing occurred under both dry and wet conditions. Specimens subject to dry storage were stored in an environmental chamber with a set relative humidity of 50±4% and a temperature of 73±3° F. (22.7±1.66° C.) (per ASTM 157). All length change tests were conducted for a period longer than 365 days. Surface resistivity testing was employed to assess the relative permeability of the ash-amended concretes and to examine the concrete's resistance to chloride ion penetration, in accordance with AASHTO TP-95. Specimens were tested in triplicate using a concrete resistivity meter at 6 intervals over a period of 92 days.

3.0 Results and Discussion 3.1 Preliminary Strength Testing

Figure 21:
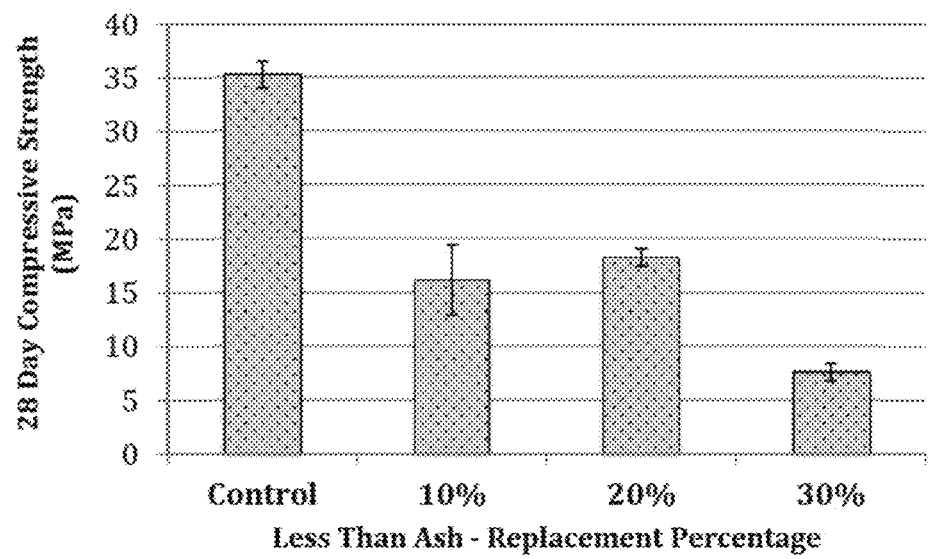
FIG. 21 shows 28 day compressive strength of an embodiment of coarse aggregate replaced with LT-9.5 ash.
Figure 22:
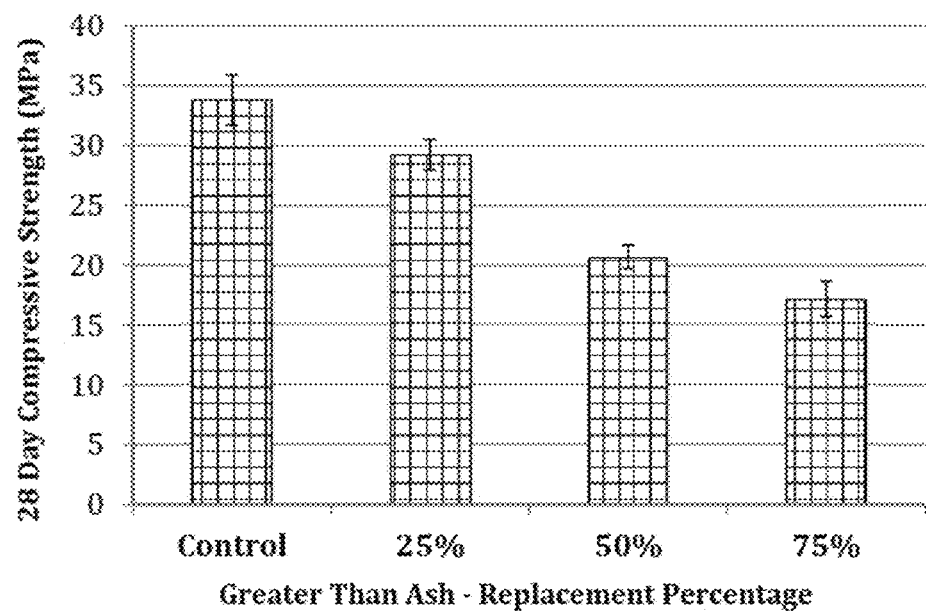
FIG. 22 depicts 28 day compressive strength of an embodiment of coarse aggregate replaced with GT-9.5 ash.

An uncarbonated sample of the LT-9.5 BA was used to replace 10, 20, and 30% of the course aggregate in a series of PCC mixes. The 28 day compressive strength results for the LT-9.5 and GT-9.5 ash mixes are shown in FIGS. 21 and 22. The measured LA loss for the LT-9.5 (38%) and GT-9.5 (42%) ash (FIG. 20) did meet the specification of 45% set by the Florida Department of Transportation, indicating it can have suitable strength for use as an aggregate in PCC [34].

The GT-9.5 ash was used to produce a series of PCC mixes where 25%, 50%, and 75% of the coarse aggregate was replaced with BA. In this experiment, an uncarbonated ash sample was used. The compressive strength of the ash-amended mixes were lower than that of the control mix. The 28 day strength for the GT-9.5 ash-amended and control specimens is shown in FIG. 2. As the aggregate replacement percentage of ash added increased, the resulting compressive strength of the PCC can change. The compressive strength changes measured for the GT-9.5 ash were not as substantial as the strength changes seen for the PCC amended with the LT-9.5 ash.

A number of authors have suggested hydrogen gas can be produced during the early phases of hydration for concretes amended with WTE BA; these authors cite that reaction can occur between aluminum in WTE BA ash and hydroxides found in the concrete as a mechanism of gas production [7, 12, 35, 36]. This reaction can decrease strength (due in part to an increase void space within the hardened cement paste) as well as spalling for conditions where aluminum is present near the surface of the concrete [7, 12, 35]. Hydrogen gas formation is a mechanism that can reduce the strength in the LT-9.5 ash mixes.

At a typical WTE facility (including the facility where the BA was sampled), non-ferrous metals (primarily aluminum) can be recovered from the ash following combustion by utilizing an eddy-current separator [37, 38]. The eddy-current separator can remove a percentage of the aluminum from the ash, but a significant fraction can remain in the waste stream following processing. Grosso et al., reported average eddy current separator efficiencies of approximately 30% and indicated that majority of the remaining aluminum can be concentrated in the smaller size fractions (<12 mm) as eddy current separators can increase in efficiency with increasing particle size [37]. A 2013 study conducted by Biganzoli et al. (2013) reported Al concentrations in the range of 8% by mass for the fine (<4 mm) fraction of BA [38].

The results of the total environmentally available digestions found the aluminum content for the GT and LT material can be 2.6% and 3.3% respectively. Note that the results of the EPA 3050b test do not differentiate between metallic Al and mineral Al, such as the aluminum contained in ettringite ($Ca_6Al_2(SO_4)_3(OH)_{12} \cdot 26H_2O$), a calcium based aluminosulfate known to be contained in WTE ash. However, they can provide a reference concentration for total aluminum (for comparison to other studies) as well as a quantitative indicator that the LT fraction can contain more total aluminum. As the LT-9.5 ash can contain a higher percentage of fine material than the GT-9.5 ash, it may also contain a higher percentage of metallic Al. This could result in the impact of hydrogen gas production (in the LT-9.5 ash-amended mixes) being greater, and may decrease the compressive strengths. The strength of the LT-9.5 ash mixes could be improved by better processing the ash to improve the non-ferrous metals recovery rate.

The results from the compressive strength testing indicate that size fractionation of the WTE BA can be important with regard to the consideration for use in as an aggregate in PCC. The larger fraction, which serves as replacement for coarse aggregate (19.05 mm-9.5 mm) can achieve suitable compressive strength. However, the LT-9.5 fraction, was unable to achieve suitable compressive strength even at low replacement percentages, and it was excluded from further testing accordingly.

3.2 Impacts of Aging

To examine the impacts of ash aging, a series of PCC mixes were produced using ash that had been carbonated in accordance with the procedure outlined in Section 2.4. The GT-9.5 ash was utilized as partial course aggregate replacement (25%, 50%, and 75% of the course aggregate) in the laboratory mixes. For the purposes of comparison, uncarbonated ash mixes were batched at the same replacement percentages as well as a control mix, which contained no ash. Compressive strength, surface resistivity, and length change testing were conducted on the carbonated and uncarbonated ash samples.

3.2.1 Compressive Strength

Figure 23:
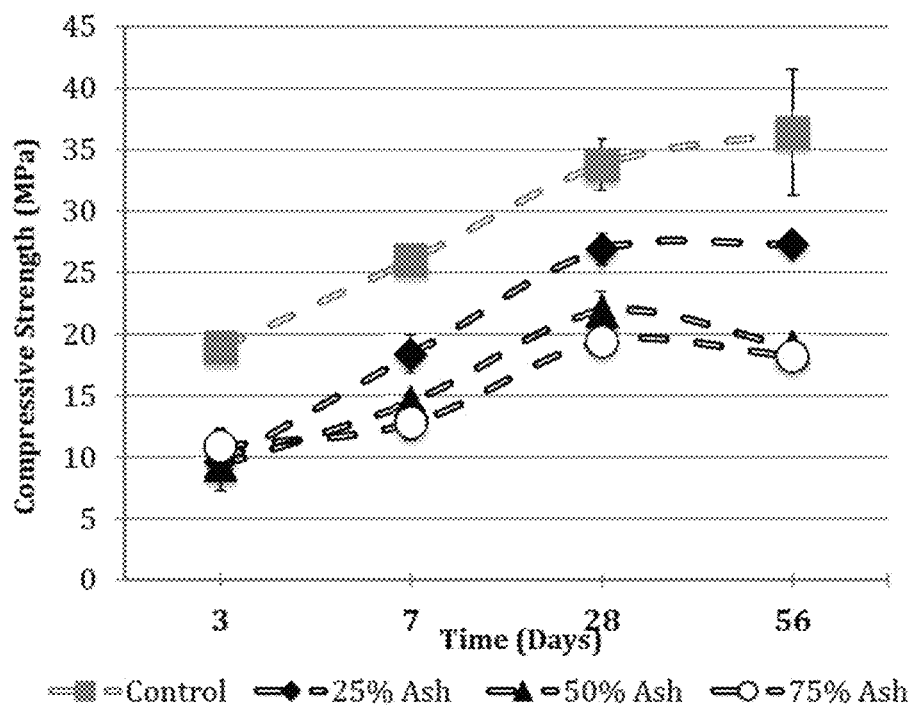
FIG. 23 shows carbonated ash-amended concrete compressive strength of an embodiment using GT-9.5 ash.
Figure 24:
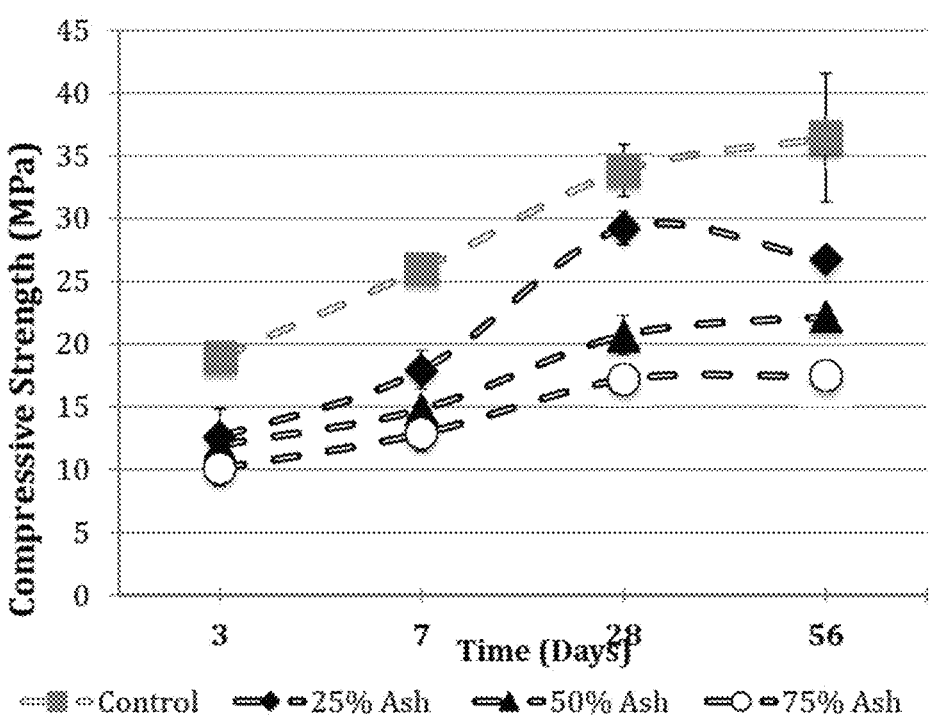
FIG. 24 illustrates uncarbonated ash-amended concrete compressive strength of an embodiment using GT-9.5 ash.

The results of the compressive strength testing of the control and experimental specimen groups amended with the carbonated and uncarbonated ash concretes are presented in FIGS. 23 and 24. At 28 days, the carbonated ash concretes yielded mean compressive strengths of 19.4, 21.8, and 26.9 MPa for the 75%, 50%, and 25% replacements respectively, and the uncarbonated samples produced mean compressive strengths of 17.2, 20.7, and 29.2 MPa for the 75%, 50%, and 25% ash concretes.

3.2.2 Concrete Length Change

To evaluate the reactivity of the WTE BA, concrete length change testing was conducted. Previous researches have cited hydrogen gas formation [7, 12, 36] as well as ASR [12] (due to the glassy fraction of the BA) as potential expansive effects related to using WTE BA in PCC. This is supported by the results of the 56 day compressive strength testing in the ash amended samples. Coal fly ash is known to decrease expansion due to ASR [39-41] and can be included in the concrete mix design to offset potential deleterious effects of ASR in the concrete. Both wet and dry length change testing was conducted for specimens produced using both the carbonated and uncarbonated WTE BA. A total of seven experimental mixes were tested, the carbonated and uncarbonated GT-9.5 ash were each used as a 25%, 50%, and 75% percent replacement of the coarse aggregate, and a control mix without ash was also produced for reference.

Specifications related to concrete length change vary between state and country. As a relative indicator of the magnitude of the changes observed, the Florida Department of Transportation (FDOT) has currently set a concrete length change standard for concrete used in repair (using ASTM C157) of 0.12% at 28 days; the maximum measured change (50% uncarbonated sample—0.032%) was less than 30% of this value. Thresholds for ASR are often set based on expansion tests that rely on the immersion of the samples in a NaOH solution (ASTM 1260, CAN/CSA A23.2-14A). [42, 43] These tests were not conducted, so a direct comparison is not applicable; however the measured wet length change at 110 days was substantially lower than the guidance set by ASTM C1260 of <0.1% within 14 days.

Figure 25:
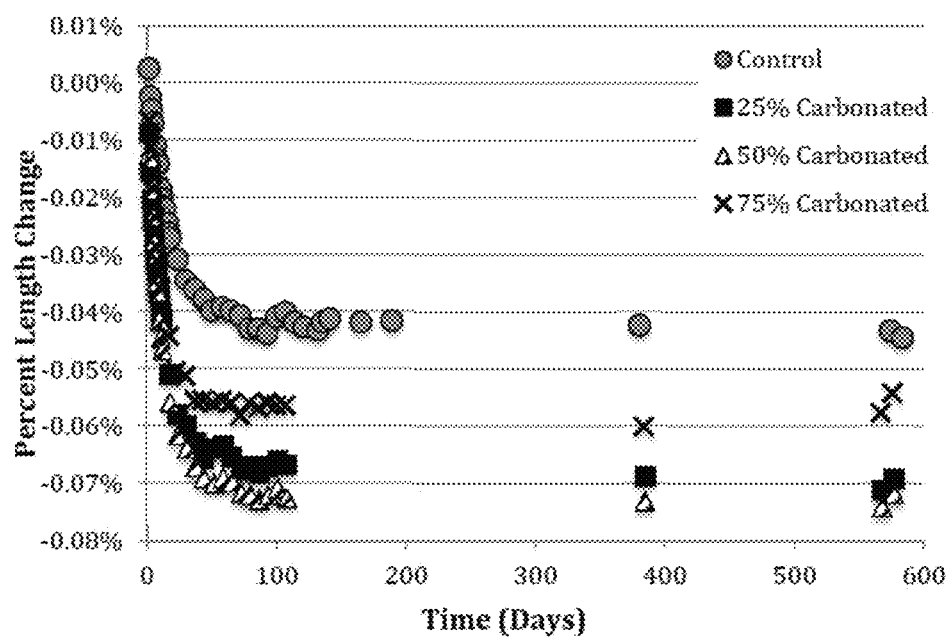
FIG. 25 shows carbonated ash-amended concrete dry length change of an embodiment of concrete using GT-9.5 ash.
Figure 26:
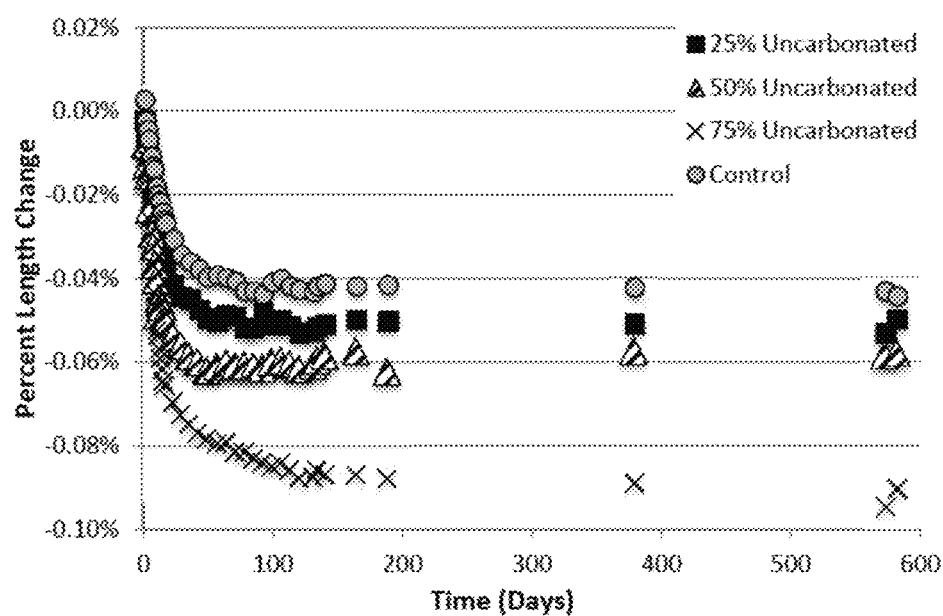
FIG. 26 shows uncarbonated ash-amended concrete dry length change of an embodiment of concrete using GT-9.5 ash.

The results of the dry length change testing for the carbonated and uncarbonated ashes are presented in FIGS. 25 and 26 respectively. Dry length change testing did not produce the high percentages (>0.12%) of expansion that would be attributed to $H_2$ formation or ASR. It is possible that the addition of the CFA may have contributed to the lack of expansion as CFA has been cited as a mechanism of reducing ASR due to a denser pore structure and a reduction in available alkalis consumed during the pozzolanic reaction [44, 45]. Additionally, the larger size of the ashes may have limited the total surface area available for reactivity, further research incorporating analysis of the concrete microstructure would be needed to confirm these hypotheses; other mechanisms to reduce ASR such as metakaolin addition can also be evaluated as to their effectiveness. Possible mechanisms for controlling expansion in WTE ash-amended concretes include limiting ash replacement percentages and utilizing a mineral admixture (CFA) that is known to reduce ASR [19].

3.2.3 Surface Resistivity

Surface resistivity testing was conducted on PCC specimens produced using the GT-9.5 ash. Similar to length change and compressive strength testing, seven PCC samples were tested (carbonated and uncarbonated BA as a 25%, 50%, and 75% course aggregate replacement, and a control). Surface resistivity testing was used to evaluate differences in the durability (relative permeability and resistance to chloride ion penetration) between the carbonated and uncarbonated ash concretes and to assess variances between the ash-amended concretes and the control. It is know that the addition of pozzolans to PCC can result in increased surface resistivity and resistance to chloride ion penetration [45, 46]. Therefore this test provides an additional indicator of the evidence of a pozzolanic activity related to the addition of the WTE BA.

Figure 27:
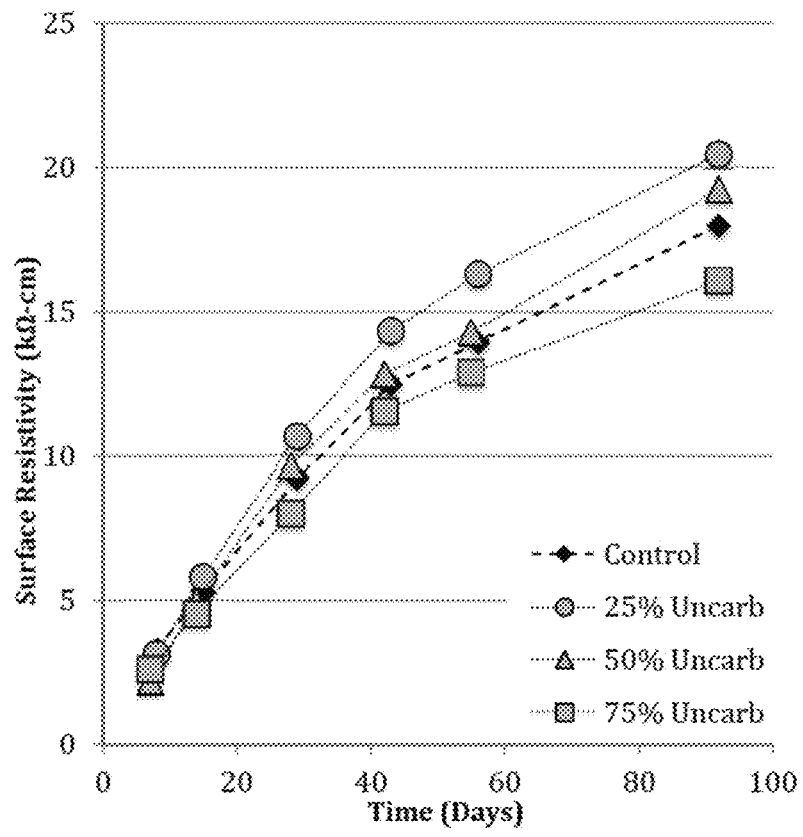
FIG. 27 shows uncarbonated ash concrete resistivity according to an embodiment of the present disclosure.
Figure 28:
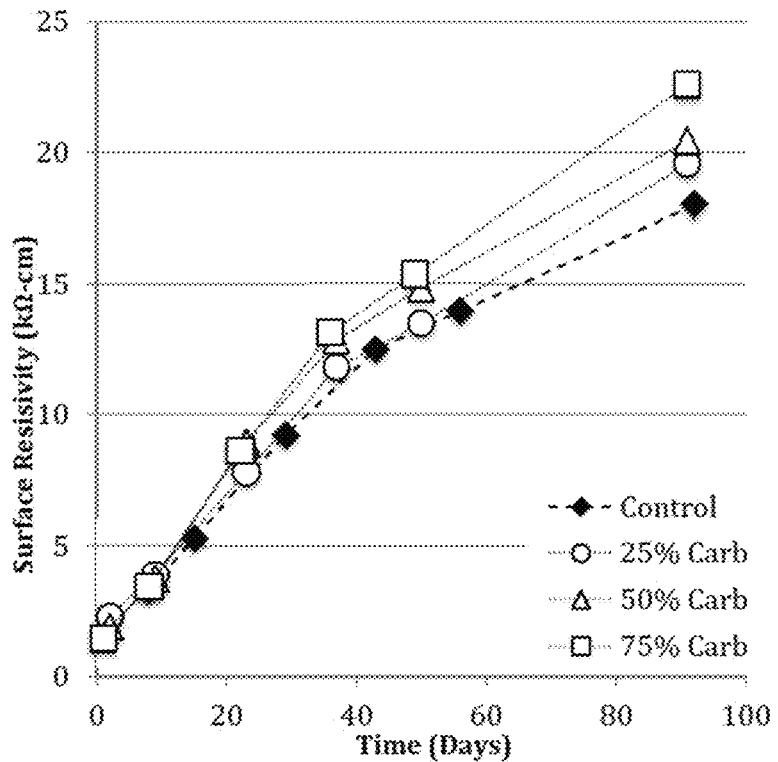
FIG. 28 shows carbonated ash concrete resistivity according to an embodiment of the present disclosure.

The surface resistivity (kΩ-cm) of the uncarbonated and carbonated ash concretes are plotted as a function of time in FIGS. 27 and 28; data on the control surface resistivity is provided for reference in each figure. As expected, the surface resistivity of all of the samples can increase with time, due to the densification of the concrete microstructure. Tanesi and Ardani, and Kessler et al. compared values from the chloride ion penetration test (ASTM C1202) [also known as the rapid chloride permeability test (RCPT)] to measured surface resistivities from a myriad of difference concrete mixtures to develop a relationship between surface resistivity and RCPT [47, 48]; based on these relationships, the majority of the measured values (for all of the samples) were found to have a moderate resistance to chloride ion penetration (12-21 kΩ-cm or 2,000-4,000 coulomb for ASTM C1202).

In all instances, surface resistivity values for the carbonated ash concretes were found to be similar to or elevated above the control sample. There were no substantial differences in measured surface resistivities between the carbonated and uncarbonated ash-amended samples, although the carbonated samples did display a trend of increasing resistivity with increasing ash replacement percentage. In 5 out of the 6 ash-amended samples tested, the surface resistivities were found to be higher than the measured values for the control. Based on the resistivity trends seen for other SCM [45, 46] these results provide evidence of a pozzolanic reaction, related to the addition of the WTE BA. This is further substantiated by the trend of increasing surface resistivity with increasing ash replacement percentages seen for the carbonated ashes.

Surface resistivity testing of the ash-amended concretes demonstrated no substantial difference in resistivity with respect to carbonation of the BA. These results indicate that the aging of WTE BA may not affect the material properties of PCC when BA is included as a coarse aggregate replacement. When comparing the surface resistivity data of the ash-amended concretes to the controls, the majority of the samples yielded a slightly higher surface resistivity. This suggests the potential for pozzolanic activity related to the addition of the ash. As leaching risk is an important consideration for concretes containing WTE BA, and leaching is function of the amount of water in contact with the material, these tests provide some evidence that the permeability of WTE BA amended and control concretes may not be expected to be significantly different.

4.0 Conclusions

The incorporation of WTE bottom ash into PCC as a partial aggregate replacement can have an impact on concrete compressive strength. Impacts for both of the BA size fractions tested (LT-9.5 ash, GT-9.5 ash) can be seen. In the case of the LT-9.5 ash, differences in strength can be seen even at low replacement percentages; this may attributed to the formation of $H_2$ gas within the concrete microstructure (cited by a number of other authors in previous studies [6, 7, 12]). This effect may be amplified due to the higher percentage of Al (and its relatively large surface area) contained in the smaller size fraction of the ash. Concrete specimens batched with only the GT-9.5 size fraction of the ash were found to perform suitably at low replacement percentages (<25%) and can exceed the 28-day design strength set for the control mix design. Carbonation may or may not significantly affect the physical properties of the WTE BA amended concretes. All ash-amended samples were found to have different properties than that of the controls, but can be comparable to controls at low replacement percentages. Length change tests illustrate the potential benefits of using a mineral admixture to reduce the potential for expansion caused by the inclusion of the ash aggregate. The results of this study suggest that WTE BA could be a viable option for use as a partial course aggregate replacement with or without being aged, provided that appropriate measures are taken to mitigate reactivity and meet strength requirements.

REFERENCES

1. Abbá, A., Collivignarelli, M. C., Sorlini, S., Bruggi, M.: On the reliability of reusing bottom ash from municipal solid waste incineration as aggregate in concrete. Composites Part B: Engineering (2014)
2. Chimenos, J., Segarra, M., Fernandez, M., Espiell, F.: Characterization of the bottom ash in municipal solid waste incinerator. J. Hazard. Mater. (1999)
3. Filipponi, P., Polettini, A., Pomi, R., Sirini, P.: Physical and mechanical properties of cement-based products containing incineration bottom ash. Waste Manage. (2003)
4. Li, X., Lv, Y., Ma, B., Chen, Q., Yin, X., Jian, S.: Utilization of municipal solid waste incineration bottom ash in blended cement. J. Clean. Prod. (2012) doi: http://dx.doi.org/10.1016/j.jclepro.2012.03.038
5. Meima, J. A., Comans, R. N.: Geochemical modeling of weathering reactions in municipal solid waste incinerator bottom ash. Environ. Sci. Technol. (1997)
6. Pan, J. R., Huang, C., Kuo, J., Lin, S.: Recycling MSWI bottom and fly ash as raw materials for Portland cement. Waste Manage. (2008) doi: http://dx.doi.org/10.1016/j.wasman.2007.04.009
7. Pera, J., Coutaz, L., Ambroise, J., Chababbet, M.: Use of incinerator bottom ash in concrete. Cem. Concr. Res. (1997)
8. Wiles, C. C.: Municipal solid waste combustion ash: State-of-the-knowledge. J. Hazard. Mater. (1996)
9. Forteza, R., Far, M., Segui, C., Cerda, V.: Characterization of bottom ash in municipal solid waste incinerators for its use in road base. Waste Manage. (2004)
10. Hjelmar, O., Holm, J., Crillesen, K.: Utilisation of MSWI bottom ash as sub-base in road construction: First results from a large-scale test site. J. Hazard. Mater. (2007)
11. Kim, J., Tasneem, K., Nam, B. H.: Material Characterization of Municipal Solid Waste Incinerator (MSWI) Ash as Road Construction Materials
12. Müller, U., Rübner, K.: The microstructure of concrete made with municipal waste incinerator bottom ash as an aggregate component. Cem. Concr. Res. (2006)
13. Meima, J. A., van der Weijden, R. D., Eighmy, T. T., Comans, R. N. J.: Carbonation processes in municipal solid waste incinerator bottom ash and their effect on the leaching of copper and molybdenum. Appl. Geochem. (2002) doi: http://dx.doi.org/10.1016/S0883-2927(02)00015-X
14. Breslin, V. T., Roethel, F. J.: Long-term diffusion of elements from municipal solid waste combustor ash blocks in the marine environment. Estuar. Coast. Shelf Sci. (1995)
15. Kosson, D. S., Garrabrants, A. C., DeLapp, R., van der Sloot, Hans A: pH-dependent leaching of constituents of potential concern from concrete materials containing coal combustion fly ash. Chemosphere (2014)
16. Roethel, F. J., Breslin, V. T.: Behaviour of dioxins, furans and metals associated with stabilized MSW combustor ash in sea water. Chem. Ecol. (1995)
17. Cioffi, R., Colangelo, F., Montagnaro, F., Santoro, L.: Manufacture of artificial aggregate using MSWI bottom ash. Waste Manage. (2011) doi: http://dx.doi.org/10.1016/j.wasman.2010.05.020
18. Mindess, S., Young, J. F., Darwin, D.: Concrete (2003)
19. Neville, A. M.: Properties of concrete. Pitman London (1973)
20. Atiş, C. D.: Accelerated carbonation and testing of concrete made with fly ash. Constr. Build. Mater. (2003) doi: http://dx.doi.org/10.1016/S0950-0618(02)00116-2
21. Khunthongkeaw, J., Tangtermsirikul, S., Leelawat, T.: A study on carbonation depth prediction for fly ash concrete. Constr. Build. Mater. (2006) doi: http://dx.doi.org/10.1016/j.conbuildmat.2005.01.052
22. Roessler, J. G., Oehmig, W. N., Blaisi, N. I., Townsend, T. G.: Chemical Characterization of High-Temperature Arc Gasification Slag with a Focus on Element Release in the Environment. Environ. Sci. Technol. (2014)
23. Arickx, S., Van Gerven, T., Vandecasteele, C.: Accelerated carbonation for treatment of MSWI bottom ash. J. Hazard. Mater. (2006) doi: http://dx.doi.org/10.1016/j.jhazmat.2006.01.059
24. US-EPA: Acid Digestion of Sediments, Sludges, and Soils (1996)
25. ASTM C618: Standard Specification for Coal Fly Ash and Raw or Calcined Natural Pozzolan for Use in Concrete (2012)
26. ASTM C127: Standard test method for density, relative density (specific gravity) and absorption of fine aggregate (2008)
27. ASTM C131: Standard Test Method for Resistance to Degradation of Small-Size Coarse Aggregate by Abrasion and Impact in the Los Angeles Machine <br/> (2014)
28. ASTM C192: Standard Practice for Making and Curing Concrete Specimines in the Labratory (2014)
29. AASHTO: Sizes of Aggregate for Road and Bridge Construction. AASHTO M43 (2009)
30. ASTM C39: Standard Test Method for Compressive Strength of Cylindrical Concrete Specimens (2010)
31. Dijkstra, J. J., van der Sloot, Hans A, Comans, R. N.: The leaching of major and trace elements from MSWI bottom ash as a function of pH and time. Appl. Geochem. (2006)
32. Chimenos, J., Fernandez, A., Miralles, L., Segarra, M., Espiell, F.: Short-term natural weathering of MSWI bottom ash as a function of particle size. Waste Manage. (2003)
33. ASTM C157: Standard Test Method for Length Change of Hardened Hydraulic-Cement Mortar and Concrete (2008)
34. Florida Department of Transportation: Standard Specifications for Road and Bridge Construction (2013)
35. Bertolini, L., Carsana, M., Cassago, D., Quadrio Curzio, A., Collepardi, M.: MSWI ashes as mineral additions in concrete. Cem. Concr. Res. (2004) doi: http://dx.doi.org/10.1016/j.cemconres.2004.02.001

36. Pecqueur, G., Crignon, C., Quénée, B.: Behaviour of cement-treated MSWI bottom ash. Waste Manage. (2001) doi: http://dx.doi.org/10.1016/S0956-053X(00)00094-5
37. Grosso, M., Biganzoli, L., Rigamonti, L.: A quantitative estimate of potential aluminium recovery from incineration bottom ashes. Resour. Conserv. Recycling (2011) doi: http://dx.doi.org/10.1016/j.resconrec.2011.08.001
38. Biganzoli, L., Ilyas, A., Praagh, M. v., Persson, K. M., Grosso, M.: Aluminium recovery vs. hydrogen production as resource recovery options for fine MSWI bottom ash fraction. Waste Manage. (2013) doi: http://dx.doi.org/10.1016/j.wasman.2013.01.037
39. Dunstan, E.: The effect of fly ash on concrete alkali-aggregate reaction. ASTM Cement, Concrete and Aggregates (1981)
40. Shehata, M. H., Thomas, M. D. A.: The effect of fly ash composition on the expansion of concrete due to alkali-silica reaction. Cem. Concr. Res. (2000) doi: http://dx.doi.org/10.1016/S0008-8846(00)00283-0
41. Thomas, M.: Field studies of fly ash concrete structures containing reactive aggregates. Magazine of concrete research (1996)
42. Ramlochan, T., Thomas, M., Gruber, K. A.: The effect of metakaolin on alkali-silica reaction in concrete. Cem. Concr. Res. (2000) doi: http://dx.doi.org/10.1016/S0008-8846(99)00261-6
43. ASTM C1260: Standard Test Method for Potential Alkali Reactivity of Aggregates (Mortar-Bar Method) (2014)
44. Kou, S. C., Poon, C. S.: Properties of self-compacting concrete prepared with recycled glass aggregate. Cement and Concrete Composites (2009) doi: http://dx.doi.org/10.1016/j.cemconcomp.2008.12.002
45. Papadakis, V. G.: Effect of supplementary cementing materials on concrete resistance against carbonation and chloride ingress. Cem. Concr. Res. (2000) doi: http://dx.doi.org/10.1016/S0008-8846(99)00249-5
46. Gesoğlu, M., Özbay, E.: Effects of mineral admixtures on fresh and hardened properties of self-compacting concretes: binary, ternary and quaternary systems. Mater. Struct. (2007)
47. Tanesi, J., Ardani, A.: Surface Resistivity Test Evaluation as an Indicator of the Chloride Permeability of Concrete (2012)
48. Kessler, R. J., Powers, R. G., Vivas, E., Paredes, M. A., Virmani, Y. P.: Surface resistivity as an indicator of concrete chloride penetration resistance (2008)

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used herein have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A composition comprising:
Portland cement concrete; and
a waste-to-energy bottom ash (WTE BA) aggregate fraction, wherein the WTE BA aggregate fraction consists of WTE BA aggregates of about 9.5 mm to about 19.05 mm in size, wherein the aggregate fraction has an aluminum content of about 25,000 mg/kg dry or less.

2. The composition of claim 1, wherein the Portland cement concrete comprises Type I Portland cement, Type II Portland cement, or a combination thereof.

3. The composition of claim 1, wherein the Portland cement concrete comprises tricalcium silicate, dicalcium silicate, tricalcium aluminate, tetracalcium aluminoferrite, free calcium oxide, sulfur trioxide, or any combination thereof.

4. The composition of claim 1, wherein the aluminum content is determined using EPA testing method 3050b.

5. The composition of claim 1, wherein the WTE BA aggregate fraction is about 50% or less of the total composition.

6. The composition of claim 1, wherein the WTE BA aggregate fraction is from about 25% to about 50% of the total composition.

7. The composition of claim 1, wherein from about 12% to about 20% of the WTE BA aggregate fraction passes through a ⅜ inch sieve.

8. The composition of claim 1, further comprising coal fly ash.

9. The composition of claim 8, wherein the Portland cement concrete comprises from about 2% to about 4% coal fly ash by weight.

10. The composition of claim 1, further comprising silica fume.

11. The composition of claim 10, wherein the Portland cement concrete comprises from about 0.5% to about 1.5% of the silica fume by weight.

12. The composition of claim 1, wherein the WTE BA aggregate fraction has been mixed with water to form an aqueous suspension, wherein the aqueous suspension has a pH of about 8 to about 11.

13. The composition of claim 1, wherein the WTE BA aggregate fraction has reacted with $CO_2$ from a $CO_2$ source.

14. The composition of claim 1, further comprising lime rock, sand, water, crushed stone, gravel, recycled concrete aggregate, recycled asphalt pavement, or any combination thereof.

15. An ash-amended pavement comprising the composition of claim 1.

16. The ash-amended pavement of claim 15, wherein the ash-amended pavement leaches a lower amount of molybdenum relative to an identical pavement that has not been ash-amended.

17. The ash-amended pavement of claim 15, wherein the ash-amended pavement has a compressive strength of at least about 20 MPa.

18. The ash-amended pavement of claim 15, wherein the ash-amended pavement exhibits a wet length change after 110 days of less than 0.1%.

19. The ash-amended pavement of claim 15, wherein the ash-amended pavement exhibits a dry length change after 110 days of less than 0.1%.

20. The ash-amended pavement of claim 15, wherein the ash-amended pavement comprises a difference in surface resistivity difference of less than or equal to about 5 kΩ·cm compared to an identical pavement that has not been ash-amended.

* * * * *